United States Patent
Nomani et al.

(10) Patent No.: US 12,395,477 B2
(45) Date of Patent: Aug. 19, 2025

(54) SYSTEMS AND METHODS FOR COLLABORATIVE BLOCKCHAIN ESTABLISHMENT FOR BLOCKCHAIN-BASED SECURE KEY EXCHANGE

(71) Applicant: Verizon Patent and Licensing Inc., Basking Ridge, NJ (US)

(72) Inventors: Muhammad Salman Nomani, Hillsborough, NJ (US); John M. Stokes, Yorba Linda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 677 days.

(21) Appl. No.: 17/659,152

(22) Filed: Apr. 13, 2022

(65) Prior Publication Data

US 2022/0368683 A1 Nov. 17, 2022

Related U.S. Application Data

(63) Continuation-in-part of application No. 17/321,378, filed on May 14, 2021, now Pat. No. 11,849,032.

(51) Int. Cl.
*H04L 9/30* (2006.01)
*H04L 9/40* (2022.01)

(52) U.S. Cl.
CPC .............. *H04L 63/062* (2013.01); *H04L 9/30* (2013.01)

(58) Field of Classification Search
CPC ....... H04L 63/062; H04L 9/30; H04L 9/0841; H04L 9/50; H04L 63/0442; H04L 63/12; H04L 63/061
See application file for complete search history.

(56) References Cited

U.S. PATENT DOCUMENTS 9,729,332 B2 * 8/2017 Unagami ................ G06F 21/44
10,999,260 B1 5/2021 Silvestri et al.
(Continued)

OTHER PUBLICATIONS

"Key escrow", Wikipedia, Nov. 20, 2020 (available at https://en.wikipedia.org/w/index.php?title=Key_excrow&oldid=989705940, visited Apr. 23, 2021).
(Continued)

*Primary Examiner* — Carl G Colin
*Assistant Examiner* — Andrew Suh

(57) ABSTRACT

A system described herein provides for the secure maintaining and providing of information, such as public keys used in Public Key Infrastructure ("PKI") techniques or other techniques, using a distributed ledger (e.g., "blockchain") system. A first device may output a first request to a second device to establish a communication session between the first device and the second device, where the request includes a first value. The first device may receive a second request from the second device, including a second value, to establish the communication session between the first device and the second device. The first device may determine, based on a comparison of the first and second values, that the first device should initiate an establishment procedure of a blockchain associated with the communication session between the first device and the second device, and may accordingly output a blockchain establishment message to a set of devices.

20 Claims, 15 Drawing Sheets

(56) References Cited

U.S. PATENT DOCUMENTS

| | | | |
|---|---|---|---|
| 11,423,474 B1 | 8/2022 | Ribeiro | |
| 11,698,958 B2* | 7/2023 | Antar | G06Q 20/425 |
| | | | 726/2 |
| 2007/0201472 A1* | 8/2007 | Bhatia | H04L 47/2416 |
| | | | 370/392 |
| 2017/0359718 A1* | 12/2017 | Denny | H04L 9/0861 |
| 2019/0268312 A1* | 8/2019 | Ma | H04L 63/0435 |
| 2020/0313858 A1* | 10/2020 | Feng | G06F 21/53 |
| 2021/0004366 A1* | 1/2021 | Bartolucci | H04L 9/3073 |
| 2021/0049589 A1* | 2/2021 | Keskar | G06Q 20/3829 |
| 2021/0182423 A1* | 6/2021 | Padmanabhan | H04L 9/3271 |
| 2021/0357914 A1* | 11/2021 | Silvestri | H04L 9/0825 |
| 2022/0107994 A1 | 4/2022 | Bernardi | |
| 2022/0294611 A1 | 9/2022 | Katsumata et al. | |
| 2023/0021047 A1 | 1/2023 | Ammar et al. | |
| 2023/0121852 A1* | 4/2023 | Yan | H04L 9/3268 |
| | | | 713/153 |
| 2023/0198747 A1* | 6/2023 | Sjöberg | G06Q 20/065 |
| | | | 713/168 |

OTHER PUBLICATIONS

Maheshwari, "Learn step-by-step how to set up a basic blockchain network", Think 2021: The premier hybrid cloud and AI event, Jul. 10, 2020 (available at https://developer.ibm.com/technologies/blockchain/tutorials/quick-start-guide-for-ibm-blockchain-platform/, visited May 7, 2021).

Perrin, et al., "The Double Ratchet Algorithm", Signal, Nov. 20, 2016 (available at https://signal.org/docs/specifications/doubleratchet/, visited Apr. 23, 2021).

* cited by examiner

SYSTEMS AND METHODS FOR COLLABORATIVE BLOCKCHAIN ESTABLISHMENT FOR BLOCKCHAIN-BASED SECURE KEY EXCHANGE

CROSS-REFERENCE TO RELATED APPLICATION

This Application is a Continuation-in-Part of U.S. patent application Ser. No. 17/321,378 filed on May 14, 2021, titled "SYSTEMS AND METHODS FOR BLOCKCHAIN-BASED SECURE KEY EXCHANGE," the contents of which are herein incorporated by reference in their entirety.

BACKGROUND

Some encryption techniques, such as Public Key Infrastructure ("PKI") techniques, may make use of public keys, which may be used to encrypt messages that may be decrypted using an associated private key, and/or may be used in other techniques. Public keys may be distributed or stored by key escrow systems, which may provide a single point of failure and/or an opportunity for a "man-in-the-middle" attack, via which public key may be obtained, modified, and/or otherwise compromised.

DETAILED DESCRIPTION OF EXAMPLE EMBODIMENTS

The following detailed description refers to the accompanying drawings. The same reference numbers in different drawings may identify the same or similar elements.

Embodiments described herein provide for the secure maintaining and providing of information, such as public keys used in PKI techniques or other techniques, using a secure distributed ledger (e.g., "blockchain") system. For example, embodiments described herein may utilize a blockchain system in lieu of a key escrow system in the exchange and/or providing of public keys in a Diffie-Hellman key exchange technique, a key wrap exchange technique, or other type of technique in which public keys are provided from one entity to another. For example, as discussed herein, a first entity may generate an asymmetric key pair that includes a public key and a private key, and may provide the public key to a blockchain system for retrieval by one or more other entities. For example, the entities may be engaged in a secure messaging session, in which messages are encrypted and may be decrypted using one or more keys, including the public key. For example, the messaging session may be associated with multiple key derivation functions, in which a first key or set of keys (e.g., "root" keys) are used in the generation of one or more other keys (e.g., "send" keys and/or "receive" keys). A root key derivation function, for example, may be performed by first and second entities engaged in the communication session to generate respective send and/or receive keys for each entity. The entities may make use of different private keys in their respective root derivation functions, but may utilize one or more shared public keys for their respective root derivation functions. Examples of techniques that make use of multiple key derivation functions, including a root derivation function utilizing one or more shared public keys, include a "double ratchet" encryption technique, a "Signal Protocol," and/or other types of techniques.

In some embodiments, the contents of the secured ledger system (e.g., blockchain) may be publicly available or accessible, but the information stored therein may have no meaning or use to an attacker or other malicious user, in the context of obtaining public keys associated with PKI techniques or other techniques. In some embodiments, a private blockchain may be used, in which only authorized entities are able to access the information stored in the private blockchain. Further, as records stored in a blockchain system are immutable, an attacker may be prevented from modifying public keys and thereby potentially having access to information encrypted based on such keys. For simplicity, embodiments described herein are described in the context of the secured ledger system being a blockchain system. However, similar concepts may apply to another type of secured ledger system other than a blockchain system.

Figure 1:
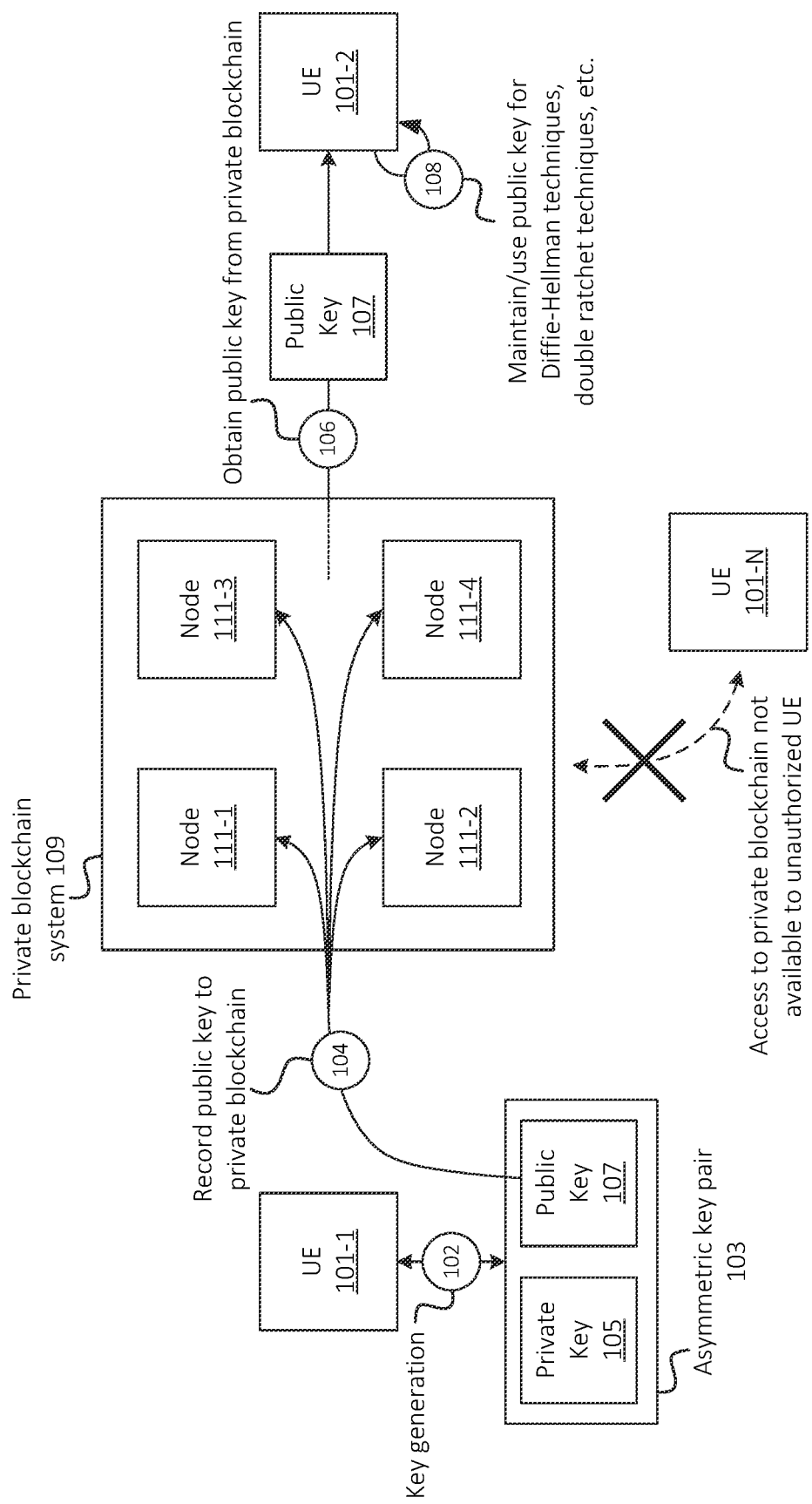
FIG. 1 illustrates an example overview of one or more embodiments described herein.

As shown in FIG. 1, a first entity, such as User Equipment ("UE") 101-1, may generate (at 102) a set of keys. The set of keys may be, and/or may include, asymmetric key pair 103, which may include private key 105 and public key 107. Private key 105 may be used to decrypt information encrypted by public key 107, may be used in a double ratchet and/or Signal Protocol technique, and/or may be used for other suitable purposes. UE 101-1 may securely store private key 105, such as in a local storage device associated with UE 101-1, in a private key store, in a Universal Integrated Circuit Card ("UICC"), and/or in some other secure location.

As further shown, UE 101-1 may record (at 104) the public key to a blockchain system, such as private blockchain system 109. As noted above, private blockchain system 109 may be "private," in that only authorized entities (e.g., authorized UEs, authorized users, etc.) may have access to the information stored in private blockchain system 109. The information stored in private blockchain system 109 may be organized as "blocks," where one particular record corresponds to one particular block, and/or where one block includes multiple records. A block may also include a reference to one or more other blocks (e.g., a "previous" block and/or a "next" block), such that a group of blocks and their associated references may form a "chain" of blocks. Further, private blockchain system 109 may include a set of nodes 111 that form a consensus regarding the blocks of which the blockchain is comprised, thus preventing unauthorized changes to the information stored in the blockchain, as well as resiliency in case any particular node 111 is compromised or otherwise becomes unavailable. In some embodiments, nodes 111 may each be implemented by a respective UE 101, such as a mobile telephone, a workstation computer, a tablet, an Internet of Things ("IoT") device, and/or other suitable type of device. While shown in the figure as being "external" to private blockchain system 109, in practice, UE 101-1 may be, and/or may implement, a particular node 111 associated with private blockchain system 109.

When recording the public key to private blockchain system 109, UE 101-1 may provide an identifier associated with UE 101-1 and/or other identifying information based on which the public key may be retrieved by an entity that may use the public key. For example, the record may include an Internet Protocol ("IP") address associated with UE 101-1, a device name, a user name, a Session Initiation Protocol ("SIP") address, and/or some other suitable information associated with UE 101-1.

Additionally, or alternatively, the record may include a session identifier, which may identify a communication session between UE 101-1 and another UE, such as UE 101-2. For example, UE 101-1 and UE 101-2 may be engaged in a secure messaging session, in which UE 101-1 and UE 101-2 exchange encrypted messages. The messaging session may be associated with a double ratchet technique, a Signal Protocol technique, and/or other type of technique in which UE 101-1 and UE 101-2 provide public keys to each other.

Briefly, for example, for each message sent between UE 101-1 and UE 101-2, a new public key may be generated (e.g., in an alternating fashion, where UE 101-1 generates a public key for a first message, UE 101-2 generates a public key for a second message, UE 101-1 generates a public key for a third message, and so on). As described below, these alternating shared public keys may serve as a first "ratchet" in a double ratchet technique to ensure security of the encrypted communications. For example, as discussed below, the public keys may be used to generate symmetric send and/or receive keys, which may be used to encrypt and/or decrypt communications between UE 101-1 and UE 101-2 without transmitting the send and/or receive keys between each other.

Private blockchain system 109 is illustrated as including four nodes 111-1, 111-2, 111-3, and 111-4. In practice, private blockchain system 109 may include fewer nodes and/or additional nodes. Private blockchain system 109 may, in some embodiments, be associated with one or more suitable authentication mechanisms whereby only authorized devices or systems are able to participate as nodes 111 of private blockchain system 109. For example, as discussed herein, particular users or UEs 101 may be specified or automatically identified (e.g., based on an address book or contact list associated with a particular UE 101 that is authorized to access private blockchain system 109 and/or some other suitable technique). As such, unauthorized devices, such as UE 101-N, may not be able to access information stored in private blockchain system 109 and/or may not be able to participate as a node 111 of private blockchain system 109. Further, as the nodes 111 of private blockchain system 109 may only include trusted devices, the integrity of the information stored by private blockchain system 109 may be enhanced, as the likelihood of a compromise or attack of private blockchain system 109 may be reduced or eliminated. Further, the recording and/or accessing of private blockchain system 109 may be private with respect to external devices that do not have access to private blockchain system 109.

In some embodiments, separate private blockchain systems 109 may be established for discrete groups, such as messaging or conversation groups (e.g., where a first communication session includes a first set of participants and is associated with a first private blockchain system 109, and where a second communication session includes a second set of participants and is associated with a second private blockchain system 109). In some embodiments, a single private blockchain system 109 may be associated with multiple communication sessions, where keys associated with a given communication session may be protected by a set of smart contracts or other security mechanisms that are accessible only to participants in the communication session.

Once recorded to private blockchain system 109, public key 107 may be obtained (at 106) by UE 101-2 and/or another device or system to which the information stored in private blockchain system 109 is available. For example, as noted above, UE 101-2 may be a UE with which UE 101-1 is engaged in a communication session via which UE 101-1 and UE 101-2 exchange encrypted communications. UE 101-2 may identify a record stored in private blockchain system 109 that includes the identifier associated with UE 101-1, a communication session associated with UE 101-1 and UE 101-2, and/or some other suitable identifier. In some embodiments, UE 101-2 may be a node 111 of private blockchain system 109, and may maintain a full copy of the blockchain stored by private blockchain system 109. In some embodiments, private blockchain system 109 may implement or be communicatively coupled to a search system, which may provide records that match a query. For example, UE 101-2 may query private blockchain system 109 for the identifier associated with UE 101-1 and/or a communication session with UE 101-1, and private blockchain system 109 may return one or more blocks that include the identifier associated with UE 101-1 and/or the communication session. In some embodiments, private blockchain system 109 may return, and/or UE 101-2 may otherwise identify, the latest (e.g., most current) block matching the query. In this manner, in situations where UE 101-1 has provided multiple public keys to private blockchain system 109 over time, UE 101-2 may be able to retrieve and/or otherwise identify the newest public key. Identifying the newest public key may be useful in a double ratchet technique, a Signal Protocol technique, and/or some other technique in which an updated public key is used for each message between UE 101-1 and UE 101-2. In some embodiments, public keys may be provided with sequence numbers or other information, based on which public keys associated with communications received in a non-sequential manner (e.g., out of order) may be identified.

In some embodiments, the public key may be provided as part of a Diffie-Hellman exchange or some other suitable technique in which public keys associated with multiple UEs 101 are exchanged amongst each other. UE 101-2 may accordingly maintain and/or use (at 108) the received public key for a double ratchet technique, a Signal Protocol technique, and/or in some other technique that involves a Diffie-Hellman key exchange or other type of key exchange procedure.

Figure 2:
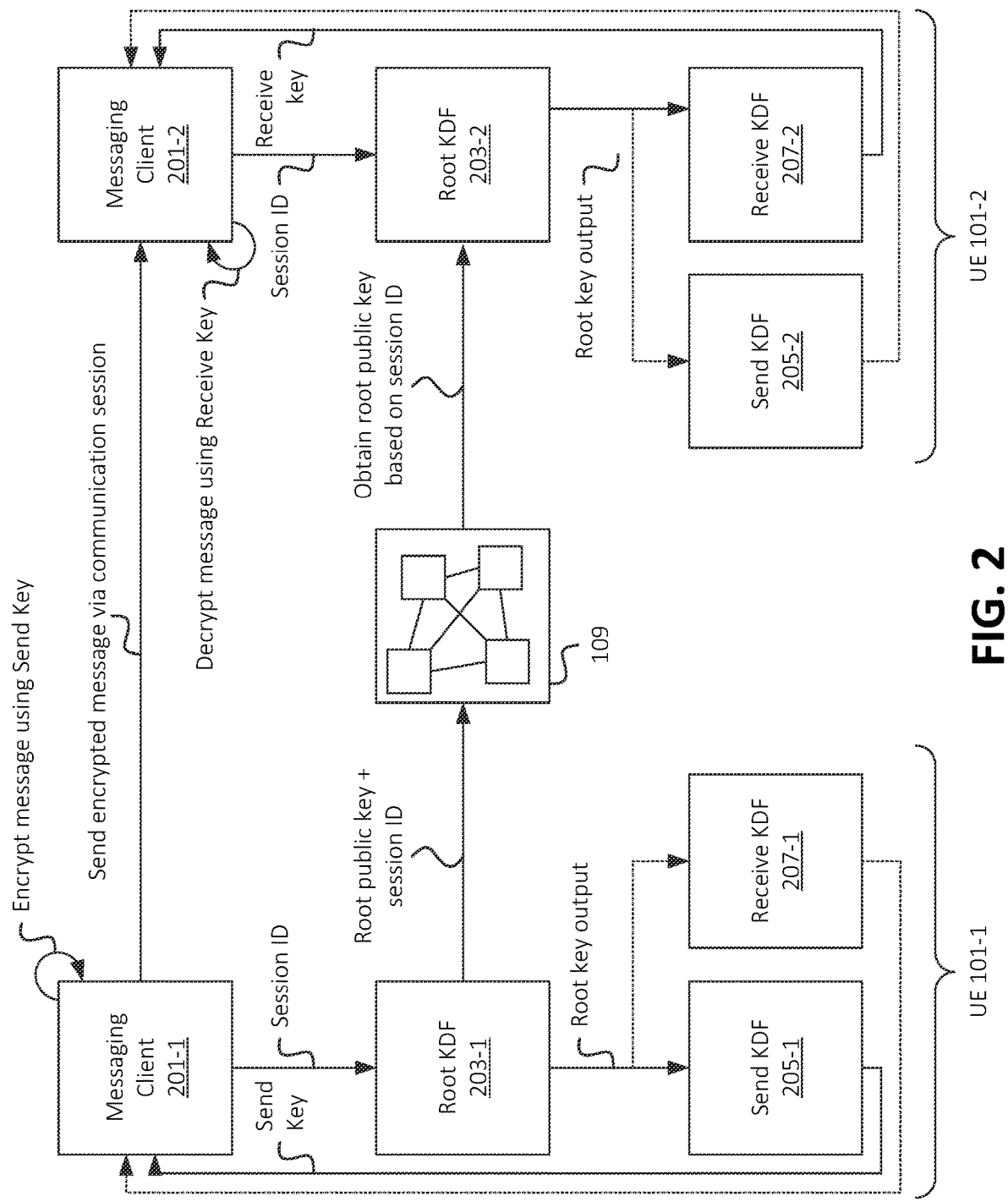
FIG. 2 illustrates an example of using a shared public key via a private blockchain system, in accordance with some embodiments, in a communication that utilizes double ratchet techniques to secure communications.

FIG. 2 illustrates an example of using a shared public key (e.g., shared via private blockchain system 109, in accordance with some embodiments) in a communication technique that utilizes double ratchet techniques to secure communications between UE 101-1 and UE 101-2. As shown, UE 101-1 and UE 101-2 may each include a respective messaging client 201, which may send and/or receive encrypted communications. For example, messaging client 201-1, associated with UE 101-1, may encrypt communications based on techniques described herein, and may send the encrypted communications to messaging client 201-2 associated with UE 101-2. Messaging client 201-2 may receive encrypted communications from UE 101-1 (e.g., from messaging client 201-1), may decrypt the communications based on techniques described herein, and may present the decrypted communications (e.g., via a graphical user interface ("GUI") or other suitable manner of presentation). Similarly, messaging client 201-2, associated with UE 101-2, may encrypt communications based on techniques described herein, and may send the encrypted communications to messaging client 201-1 associated with UE 101-1. Messaging client 201-1 may receive encrypted communications from UE 101-2 (e.g., from messaging client 201-2), may decrypt the communications based on techniques described herein, and may present the decrypted communications (e.g., via a GUI or other suitable manner of presentation).

The encryption and/or decryption by messaging client 201-1 and/or messaging client 201-2 may be performed using a symmetric key that is generated based on a double ratchet technique, a Signal Protocol technique, and/or other suitable technique. For example, as discussed herein, the symmetric key may be used by a sender (e.g., UE 101-1, in this example) to encrypt a communication, and may be used by a recipient (e.g., UE 101-2, in this example) to decrypt the communication. The symmetric keys may be generated by respective Send Key Derivation Function ("KDF") 205 and/or Receive KDF 207 associated with the sender and/or recipient. The symmetric keys may be generated based on one or more root keys provided by Root KDF 203 to Send KDF 205 and/or Receive KDF 207. For example, Root KDF 203-1 may provide a root key output based on a public key and a private key to Send KDF 205-1, which may generate a send key (e.g., based on the root key output and one or more private keys)s which may be used to encrypt communications to be sent by messaging client 201-1. The private key based on which the root key output is generated may be privately maintained by UE 101-1 (e.g., not sent to UE 101-2), while the public key may be shared with UE 101-2 via private blockchain system 109, in accordance with embodiments described herein. Root KDF 203-1 may provide a different root key output for each message sent and/or received by messaging client 201-1, based on a public key exchange (e.g., via a Diffie-Hellman key exchange or other suitable procedure) with UE 101-2, which may be performed each time a message is sent by UE 101-1 and/or UE 101-2.

For example, when UE 101-1 sends a message, Root KDF 203-1 may generate a root key output, and may further output a public key based on which the root key output was generated, to private blockchain system 109. As discussed above, the public key may be provided with a session identifier (e.g., to identify a communication session between messaging client 201-1 and messaging client 201-2), an identifier associated with UE 101-1, an identifier associated with UE 101-2, and/or other suitable information based on which UE 101-2 may identify that the public key recorded to private blockchain system 109 is associated with the communication session between UE 101-1 and UE 101-2.

UE 101-2 (e.g., Root KDF 203-2) may obtain the root public key from private blockchain system 109 based on the session identifier or other suitable identifier, and may generate a root key output based on the obtained public key and a private key (e.g., a different private key than the private key used by Root KDF 203-1 to encrypt the communication). As noted above, using private blockchain system 109 to exchange public keys may maintain the integrity of the keys, such as by preventing malicious actors from modifying or "spoofing" keys. Further, using private blockchain system 109 may aid in situations where a given UE 101 (e.g., UE 101-2, in this example) is "offline" or is otherwise unavailable to receive public keys from another UE 101 (e.g., UE 101-1, in this example) at the time that the other UE 101 outputs the public keys.

Root KDF 203-2 may provide the root key output to Receive KDF 207-2, which may generate a receive key based on the root key output and one or more private keys. In accordance with the double ratchet techniques, Signal Protocol techniques, etc., the receive key generated by Receive KDF 207-2 may be the same as the send key output generated by Send KDF 205-1. In this manner, these respective send and receive keys may be an identical symmetric key that may be used to encrypt and decrypt communications, such as the encrypted communication sent by messaging client 201-1 to messaging client 201-2 in this example.

While an example is provided here in the context of UE 101-1 encrypting a communication, sending the encrypted communication to UE 101-2, and UE 101-2 decrypting the communication, similar techniques may be performed (e.g., iteratively) for communications encrypted and sent by UE 101-2 to UE 101-1, as denoted by the dashed lines in FIG. 2. For example, Root KDF 203-2 may generate a root key pair, output a public key of the root key pair to private blockchain system 109 for retrieval by UE 101-1, generate a root key output based on the root key pair, and provide the root key output to Send KDF 205-2. Send KDF 205-2 may generate a send key based on the root key output and one or more private keys, and messaging client 201-2 may encrypt a communication based on the send key. Further, Root KDF 203-1 may retrieve the public key from private blockchain system 109, generate a root key output based on the retrieved public key and one or more private keys, and provide the root key output to Receive KDF 207-1. Receive KDF 207-1 may generate a receive key based on the root key output and one or more private keys, and messaging client 201-1 may decrypt a communication received from messaging client 201-2, as encrypted based on a matching send key.

Figure 3:
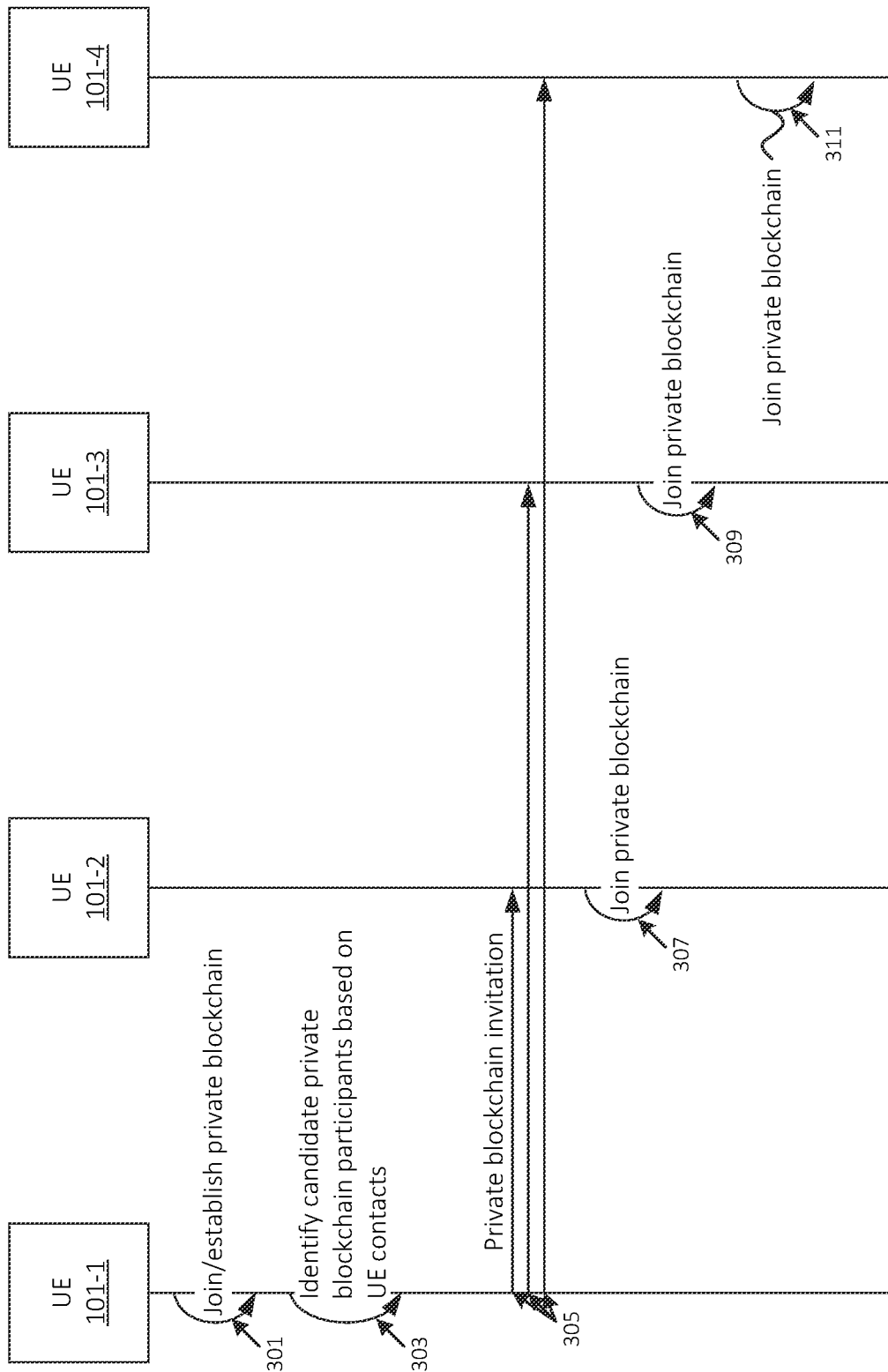
FIG. 3 illustrates an example of establishing a private blockchain system, in accordance with one or more embodiments.

As noted above, private blockchain system 109 may be a "private" blockchain, in that only approved UEs 101 (or other suitable devices or systems) may participate in private blockchain system 109 as nodes 111 of private blockchain system 109. In some embodiments, eligible participants may be identified based on an automated determination of contacts associated with one or more participant nodes 111 of private blockchain system 109, and/or some other suitable technique. For example, as shown in FIG. 3, UE 101-1 may establish (at 301) and/or join private blockchain system 109. For example, UE 101-1 may establish a new private blockchain system 109 by generating a "genesis" block, and/or may join an existing private blockchain system 109. In some embodiments, UE 101-1 may communicate with one or more devices or systems that facilitate the establishment of private blockchain system 109.

UE 101-1 may further automatically identify (at 303) candidate participants (e.g., nodes 111 for private blockchain system 109, devices or systems that are authorized to access information stored in private blockchain system 109, or the like). For example, UE 101-1 may identify contacts in an address book, call history, and/or other type of contact list associated with UE 101-1. Additionally, or alternatively, UE 101-1 and/or some other device or system may utilize artificial intelligence/machine learning ("AI/ML") techniques or other suitable techniques to identify UEs 101 with which UE 101-1 has communicated.

UE 101-1 may output (at 305) an invitation to join (e.g., as a node 111 and/or as an authorized viewer of information stored in private blockchain system 109) to identified UEs 101-2, 101-3, and 101-4. In some embodiments, UE 101-1 (e.g., an application or application programming interface ("API") associated with UE 101-1) may communicate with contacts in a contact list associated with UE 101-1 (e.g., where the contacts include UEs 101-2, 101-3, and 101-4 in this example) via one or more suitable messaging or other types of communication applications, and may identify particular ones of the contacts participate in a key escrow or other type of key exchange. UE 101-1 may output an invitation to private blockchain system 109 to the identified contacts via the messaging or other communication applications and/or some other suitable communication pathway. In some embodiments, the invitation may include identifying information associated with UE 101-1, such as an IP address associated with UE 101-1, an MDN associated with UE 101-1, an IMEI value associated with UE 101-1, an IMSI value associated with UE 101-1, and/or some other suitable identifier.

UEs 101-2, 101-3, and 101-4 may accordingly join (at 307, 309, and 311, respectively) private blockchain system 109. For example, such UEs 101-2, 101-3, and 101-4 may register as nodes 111 using information provided (at 305) by UE 101-1, and/or may access information stored in private blockchain system 109 using such information. In this manner, private blockchain system 109 may be "private" inasmuch as UEs 101 which were not invited (at 305) to private blockchain system 109 may not access the information stored in private blockchain system 109.

Figure 4:
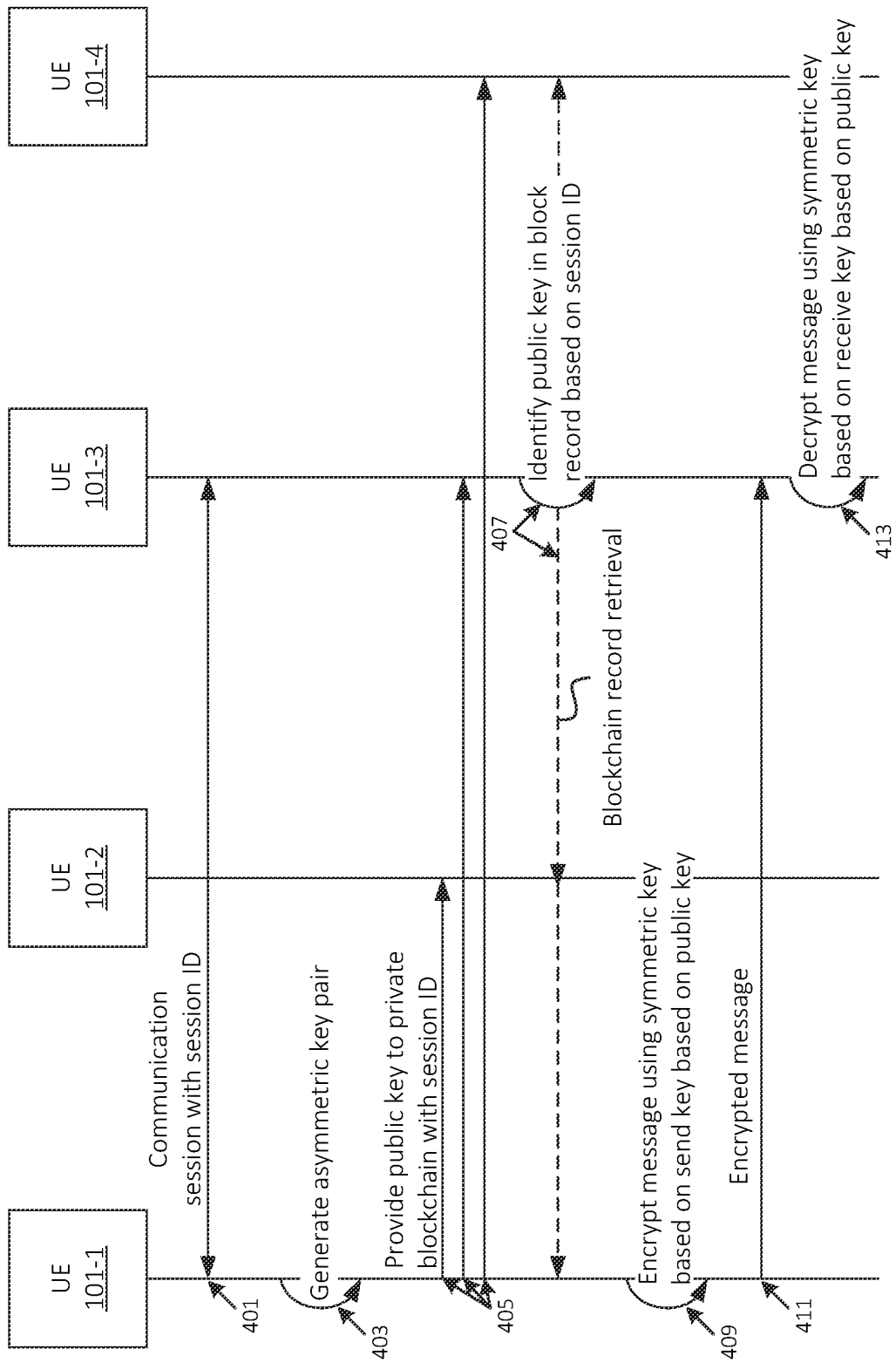
FIG. 4 illustrates an example of using a shared public key via a private blockchain system, in accordance with some embodiments, in a communication that utilizes double ratchet techniques to secure communications.

FIG. 4 illustrates an example of the use of private blockchain system 109 to exchange public keys in the encryption and/or decryption of secure communications between UEs 101 participating in a secure communication session. In this example, UEs 101-1, 101-2, 101-3, and 101-4 may be nodes 111 of private blockchain system 109. Further, UEs 101-1 and 101-3 may be participants in a communication session (e.g., via respective messaging clients 201 associated with UEs 101-1 and 101-3). For example, UE 101-1 and UE 101-3 may establish (at 401) a secure communication session using any suitable session establishment technique or protocol. The communication session may be associated with a session identifier or other suitable mechanism by which UEs 101-1 and/or 101-3 may identify the communication session. For example, an initiator of the communication session may generate or otherwise determine an identifier for the communication session, and/or UEs 101-1 and 101-3 may otherwise negotiate or determine an identifier for the communication session.

UE 101-1 may further generate (at 403) an asymmetric key pair, which may be used as part of a double ratchet technique, a Signal Protocol technique, and/or some other encryption technique used to secure communications between UEs 101-1 and 101-3. For example, the asymmetric key pair generated (at 403) by UE 101-1 may include a public key used in the generation of a send key used to encrypt communications sent to UE 101-3. While not explicitly shown in FIG. 4, UE 101-3 may also generate one or more keys that may be used in the encryption and/or decryption of messages between UEs 101-1 and 101-3, in accordance with the double ratchet technique, Signal Protocol technique, and/or other suitable encryption technique.

UE 101-1 may further provide (at 405) the public key of the generated asymmetric key pair to private blockchain system 109. As noted above, UEs 101-1, 101-2, 101-3, and 101-4 may be nodes 111 of private blockchain system 109. In other examples, UE 101-3 (e.g., a participant in the secure communication session) may not be a node 111 of private blockchain system 109, and thus UE 101-1 may not directly provide (at 405) the public key to UE 101-3. When providing (at 405) the public key to private blockchain system 109, UE 101-1 may include the session identifier of the communication session between UEs 101-1 and 101-3, and/or some other suitable identifier based on which UE 101-3 may identify (at 407) the public key provided by UE 101-1.

For example, as discussed above, UE 101-3 may retrieve (at 407) the public key from private blockchain system 109 based on identifying a record in private blockchain system 109 that includes the session identifier or other suitable identifier associated with UEs 101-1 and/or 101-3. In situations where multiple blocks exist with the session identifier, UE 101-3 may identify a latest (e.g., newest) block. For example, in accordance with the double ratchet and/or Signal Protocol techniques, a new public key may be provided each time a message is sent and/or received by UE 101-1 and/or UE 101-3. As such, identifying a latest public key associated with the communication session between UEs 101-1 and 101-3 may facilitate the secure communications according to the double ratchet and/or Signal Protocol techniques.

UE 101-1 may further encrypt (at 409) a message for UE 101-3 using a symmetric key (e.g., a send key, as similarly discussed above) that UE 101-1 generates based on the public key, one or more private keys, and/or one or more KDFs (e.g., Send KDF 205). UE 101-1 may proceed to output (at 411) the encrypted message to UE 101-3. UE 101-3 may decrypt (at 413) the message using a symmetric key (e.g., the same symmetric key as UE 101-1 used to encrypt (at 409) the message), which may be generated by one or more KDFs (e.g., Receive KDF 207) based on the retrieved (at 407) public key.

While FIG. 4 shows an example of one message being sent from UE 101-1 to UE 101-3, similar techniques may be employed when UE 101-1 sends additional messages to UE 101-3, and/or when UE 101-3 sends messages to UE 101-1. For example, UE 101-3 may generate a subsequent asymmetric key pair that is derived from and/or is otherwise based on the retrieved (at 407) public key, and may output a public key of the subsequent asymmetric key pair to private blockchain system 109. UE 101-3 may utilize this subsequently generated public key to generate a send key, and UE 101-1 may utilize this subsequently generated public key, retrieved from private blockchain system 109, to generate a receive key, as described above.

Figure 5:
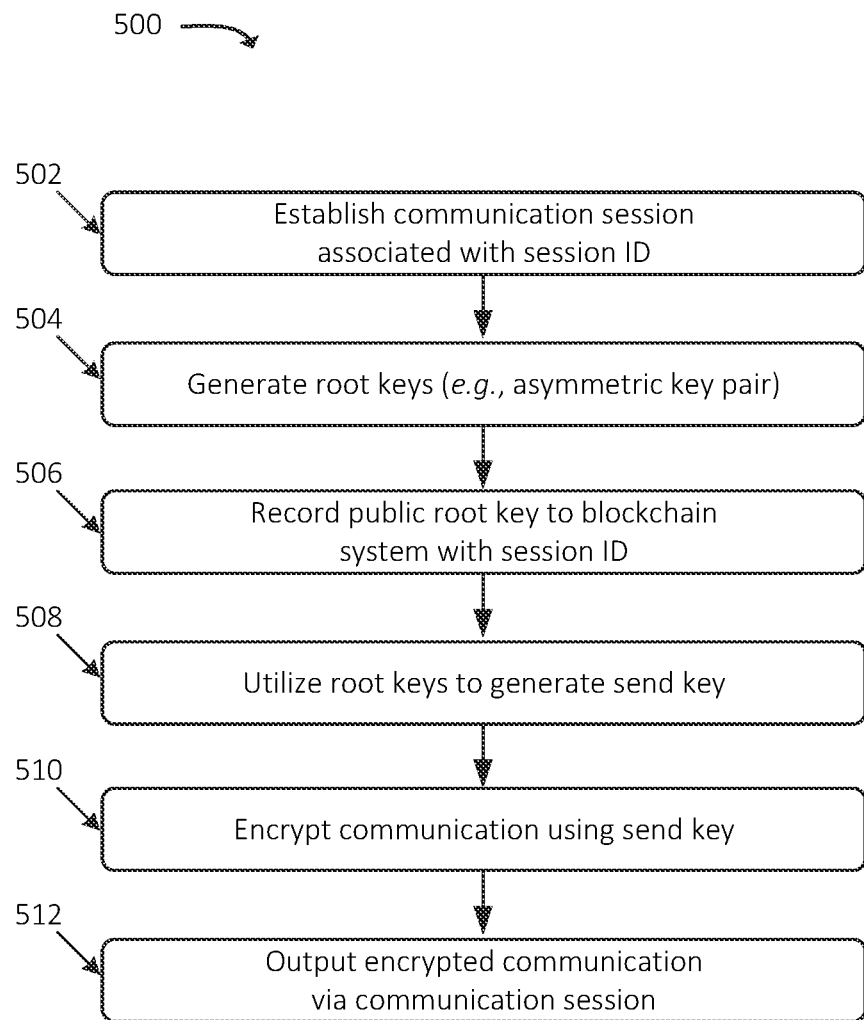
FIGS. 5 and 6 illustrate example processes for using a shared public key via a private blockchain system, in accordance with some embodiments, in a communication that utilizes double ratchet techniques to secure communications.
Figure 6:
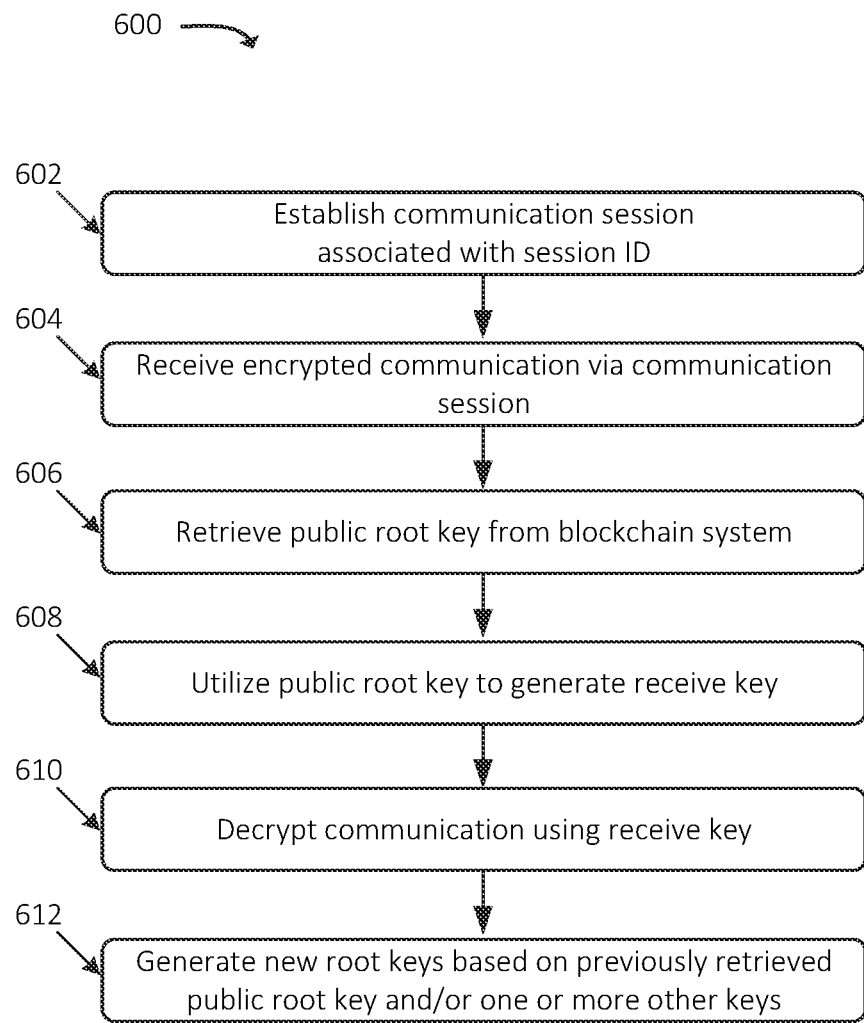

FIGS. 5 and 6 illustrate example processes 500 and 600, respectively, for utilizing blockchain techniques to share and/or exchange public keys. In the examples provided herein, the key exchange may be part of a Diffie-Hellman key exchange, a key exchange portion of a Signal Protocol technique, a key exchange portion of a double ratchet technique, and/or some other suitable secure exchange of public keys. In some embodiments, some or all of processes 500 and/or 600 may be performed by one or more UEs 101 (e.g., UEs 101 engaged in a communication session with each other and/or one or more other UEs 101). In some embodiments, one or more other devices may perform some or all of processes 500 and/or 600 in concert with, and/or in lieu of, UE 101.

As shown, process 500 may include establishing (at 502) a communication session with one or more UEs 101. The communication session may be associated with a session identifier or other identifier based on which participant UEs 101 of the communication session may identify messages exchanged with one another and/or public keys, associated with the communication session, recorded to private blockchain system 109 in accordance with embodiments described herein.

Process 500 may further include generating (at 504) a set of root keys, which may include an asymmetric key pair. For example, as discussed above, the root keys may include a private key which may be maintained securely by UE 101, and a public key which may ultimately be shared with one or more other UEs 101 (e.g., another participant in the communication session).

Process 500 may additionally include recording (at 506) the public root key (e.g., the public key of the asymmetric key pair generated at 504) to private blockchain system 109. For example, UE 101 may output the public key to private blockchain system 109, and private blockchain system 109 may propagate the information to one or more nodes 111 of private blockchain system 109. Nodes 111 may form a consensus regarding the addition of the provided public key to one or more records of private blockchain system 109, and may maintain an immutable record of the provided public key. In some embodiments, the record may include a timestamp, a block identifier, and/or other mechanism by which a recency or age of the record may be determined. As similarly described above, the record may further include a communication session identifier, an identifier of UE 101 from which the information was received, and/or other suitable information.

Process 500 may also include utilizing (at 508) the root keys to generate a send key. For example, as discussed above, Root KDF 203 may utilize the root keys (e.g., including the root public key, as well as the root private key and/or one or more other keys) to generate a root key output, and may provide the root key output to another KDF, such as Send KDF 205. Send KDF 205 may generate a send key based on the root key output from Root KDF 203 and/or based on one or more other keys or functions. As discussed above, the generated send key may be a symmetric key that may be identical to a receive key generated by a recipient of the public key, based on a Signal Protocol technique, a double ratchet technique, etc.

Process 500 may further include encrypting (at 510) a communication using the send key. Process 500 may additionally include outputting (at 512) the encrypted communication via the communication session, such as to a UE 101 with which the communication session was established (at 502).

As shown in FIG. 6, process 600 may include establishing (at 602) a communication session. For example, as similarly discussed above, UE 101 may establish a communication session with one or more other UEs 101. The communication session may be associated with a suitable identifier, based on which the UEs 101 participating in the communication session may identify communications associated with the communication session, including encrypted messages, public keys, and/or other information.

Process 600 may further include receiving (at 604) an encrypted communication via the communication session. For example, the communication may have been encrypted using one or more KDFs, where the input to the one or more KDFs include the public root key and one or more other keys (e.g., one or more private keys, one or more KDF outputs, etc.).

Process 600 may further include retrieving (at 606) a public root key from private blockchain system 109. In some embodiments, private blockchain system 109 and/or one or more devices or systems communicatively coupled to private blockchain system 109 may "push" the public root key to private blockchain system 109. For example, the one or more devices or systems may identify a particular block that includes an identifier of UE 101 (e.g., where the particular block includes the identifier of UE 101 and a public root key), may identify a particular block that includes an identifier of the communication session (e.g., where the particular block includes the identifier of the communication session and a public root key), etc. Additionally, or alternatively, UE 101 may "pull" the information from private blockchain system 109 based on a suitable identifier (e.g., an identifier of UE 101, an identifier of the communication session, etc.).

Process 600 may additionally include utilizing (at 608) the public root key to generate a receive key. For example, as discussed above, UE 101 may utilize one or more KDFs, such as Root KDF 203 and/or Receive KDF 207, to generate a receive key. The receive key may be a symmetric key with respect to a key used to encrypt a communication received by UE 101 via the communication session. For example, as discussed above, the receive key may be identical to a send key used by a sender of the communication, where the send key was also generated based on one or more KDFs and at least the public root key. For example, the sender and UE 101 may perform double ratchet techniques, Signal Protocol techniques, or the like, to respectively encrypt and decrypt the communication, without transmitting or sharing the symmetric key itself.

Process 600 may further include decrypting (at 610) the communication, received via the communication session, using the generated receive key. For example, UE 101 may apply one or more functions to decrypt the receive message using the receive key, which, as discussed above, may be the same as a send key used to encrypt the communication.

Process 600 may additionally include generating (at 612) a new set of root keys based on the previously retrieved public root key and one or more other root keys. For example, once UE 101 generates the receive key, the public root key (retrieved at 606) may be discarded and/or not used for sending messages from UE 101. In some situations, UE 101 may maintain the public root key and apply techniques described above to decrypt subsequent communications from the sender in situations where the sender sends multiple communications in a row without any intervening messages from UE 101. The new set of root keys may be generated based on the receive key (generated at 608), the public root key (retrieved at 606), and/or one or more other suitable keys. UE 101 may then proceed to output the newly generated public root key to private blockchain system 109, as similarly described above with respect to operation 506 of process 500, may generate (e.g., similar to operation 508) a new send key based on the newly generated public root key, etc.

In some embodiments, the establishment of private blockchain system 109 (e.g., as referred to in FIG. 3) may be a collaborative procedure, in which nodes 111 of private blockchain system 109 are selected by active communication session participants. In this manner, the trust and/or security provided by private blockchain system 109 may be enhanced, as nodes 111 of private blockchain system 109 may be designated by participants in communication sessions that utilize private blockchain system 109 (e.g., for the exchange of keys, as discussed above). For example, as discussed below, private blockchain system 109 may be maintained by a first set of nodes that are trusted and/or otherwise selected by a first participant in a communication session as well as by a second set of nodes that are trusted and/or otherwise selected by a second participant in the communication session.

Figure 7:
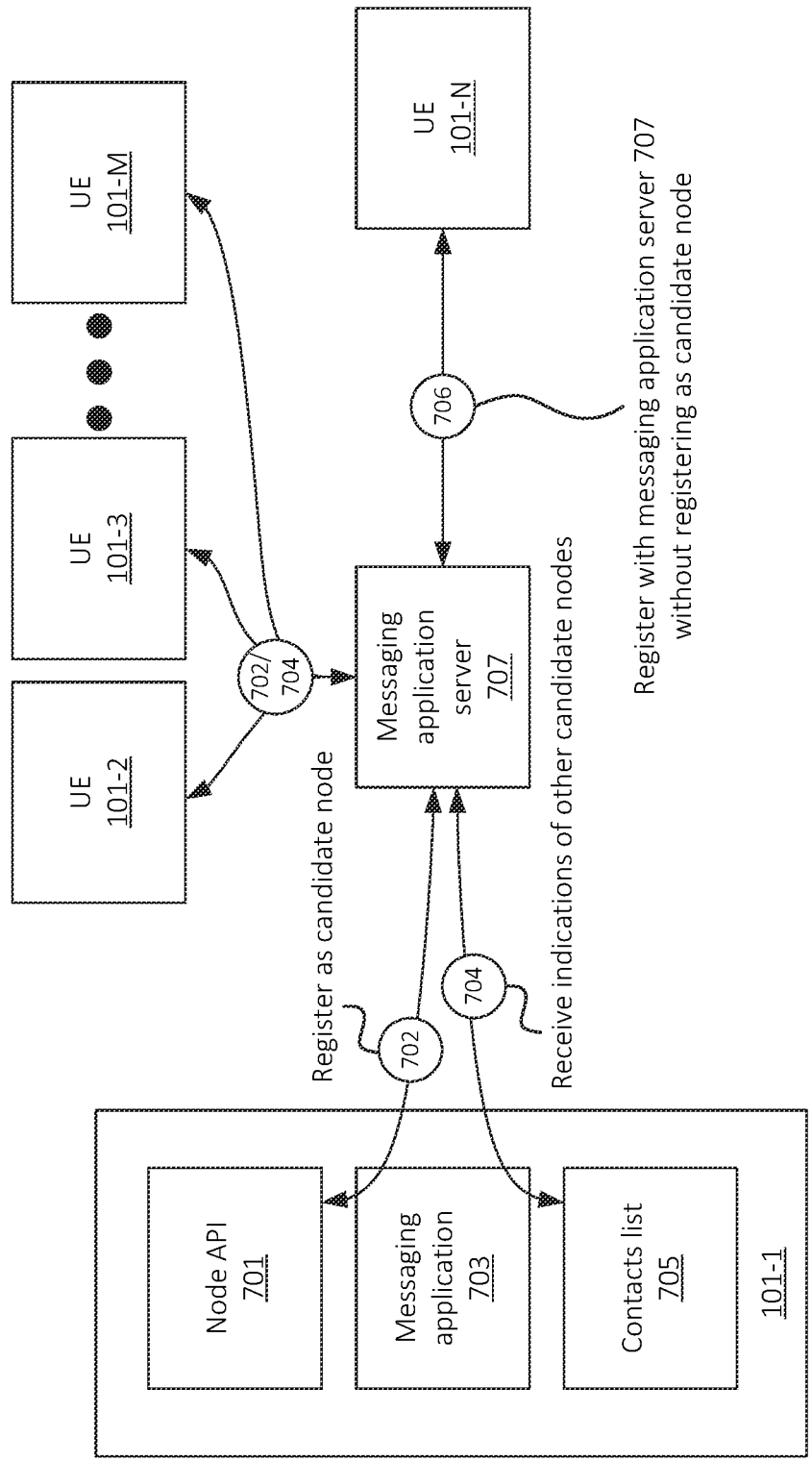
FIG. 7 illustrates an example overview of one or more embodiments described herein.

As shown in FIG. 7, for example, one or more UEs 101 may include, maintain, implement, etc. node API 701, messaging client 201, and contact list 705. Node API 701 may perform one or more operations described herein with respect to private blockchain system 109, such as communicating with nodes of private blockchain system 109, participating in the establishment of private blockchain system 109, maintaining and/or validating records associated with private blockchain system 109 (e.g., where such records may include public keys generated by one or more communication session participants, as discussed above), or other suitable operations associated with private blockchain system 109.

Messaging client 201 may receive user input relating to messages to send from a given UE 101 to other communication session participants (e.g., other UEs 101), receive messages from other UEs 101 (e.g., other instances of messaging client 201), and encrypt or decrypt messages using techniques described above (e.g., using double ratchet techniques or other suitable key-based techniques). Contact list 705 may maintain a set of contacts associated with a given UE 101, such as contacts that are trusted by the given UE 101 and/or other contacts that are otherwise candidates for participating as nodes 111 in private blockchain system 109 associated with a communication session in which UE 101 is a participant. In some embodiments, contact list 705 may include indications of which contacts are candidates for participating as nodes 111 in private blockchain system 109 from messaging application server 707 or some other source.

For example, as shown in FIG. 7, a particular UE 101-1, which includes, implements, etc. an instance of node API 701, messaging client 201, and contact list 705, may register (at 702) as a candidate node 111 with messaging application server 707. Such registration may indicate, for example, that UE 101-1 implements an instance of node API 701, that a user associated with UE 101-1 has indicated a user preference or selection for UE 101-1 to be a candidate node 111, and/or that UE 101-1 is otherwise available to act as a node 111 in one or more private blockchain systems 109 associated with one or more respective communication sessions. In some embodiments, node API 701 and/or messaging client 201 may communicate via a suitable API, via an operating system of UE 101-1, and/or in some other suitable manner. In this manner, messaging application server 707 may maintain information indicating that UE 101-1 is a candidate node 111 for one or more private blockchain systems 109. In some embodiments, UE 101-1 may indicate (at 702) one or more particular UEs 101 or contacts for which UE 101-1 is eligible to participate as a node 111 (e.g., an "allow list") and/or one or more particular UEs 101 or contacts for which UE 101-1 is not eligible to participate as a node 111 (e.g., a "block list"). Similarly, one or more other UEs 101 (e.g., UEs 101-2 through 101-M) may also register (at 702) as candidate nodes 111, and may also provide allow lists and/or block lists, as discussed above.

UE 101-1 may further receive (at 704) indications of other UEs 101 that are candidate nodes 111 for one or more private blockchain systems 109 for communication sessions in which UE 101-1 may engage. For example, messaging application server 707 may provide indications that UEs 101-2 through 101-M have registered as candidate nodes 111. In situations where one or more UEs 101 (indicated at 704) are not included in contact list 705, UE 101-1 may augment contact list 705 to additionally include such additional UEs 101. Additionally, or alternatively, UE 101-1 may discard indications (received at 704) of UEs 101 that are not in contact list 705, and may update contact list 705 to reflect which contacts, which are already included in contact list 705, are candidate nodes 111. Additionally, or alternatively, messaging application server 707 may receive or maintain a copy of contact list 705, and may only provide (at 704) indications of UEs 101 that are already in contact list 705. Similarly, one or more other UEs 101 (e.g., UEs 101-2 through 101-M) may also receive (at 704) indications of one or more other UEs 101 that are candidate nodes 111.

In some embodiments, one or more UEs 101, which may participate in communication sessions with one or more other UEs 101, may refrain from registering as a candidate node 111. For example, UE 101-N may register (at 706) with messaging application server 707, without registering as a candidate node 111. UE 101-N may, for example, not implement node API 701, a user of UE 101-N may have disabled a setting or preference whereby node capability is enabled, and/or UE 101-N may otherwise not be a candidate node 111. In some embodiments, messaging application server 707 may provide (at 704) indications to one or more other UEs 101 (e.g., UEs 101-1 through 101-M) that UE 101-N is not a candidate node 111 for one or more private blockchain systems 109 that may be associated with communication sessions in which UEs 101-1 through 101-M engage.

Figure 8:
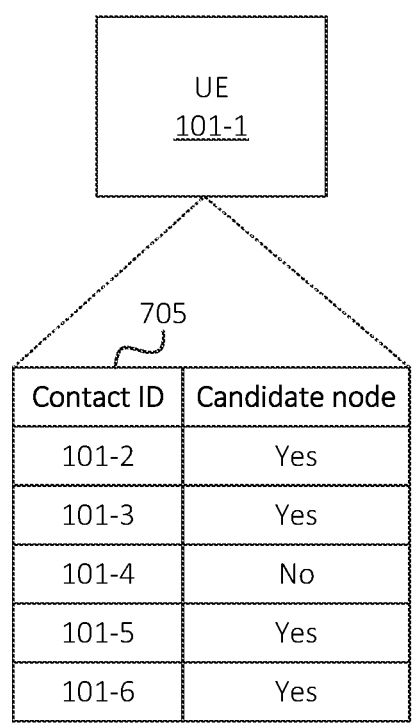
FIG. 8 illustrates an example contact list along with candidate node capability indications, in accordance with some embodiments.

As such, a particular contact list 705 (e.g., as shown in FIG. 8 with respect to example UE 101-1) may include indications of whether particular contacts (e.g., UEs 101 or other contacts) are candidate nodes 111, in the event that UE 101-1 participates in a communication session associated with one or more private blockchain systems 109, as discussed herein. For example, contact list 705 may include identifiers of one or more UEs 101 or users (e.g., IMSI values, MDNs, user identifiers, IP addresses, etc.), as well as indications of whether such UEs 101 or users are candidate nodes 111.

Figure 9:
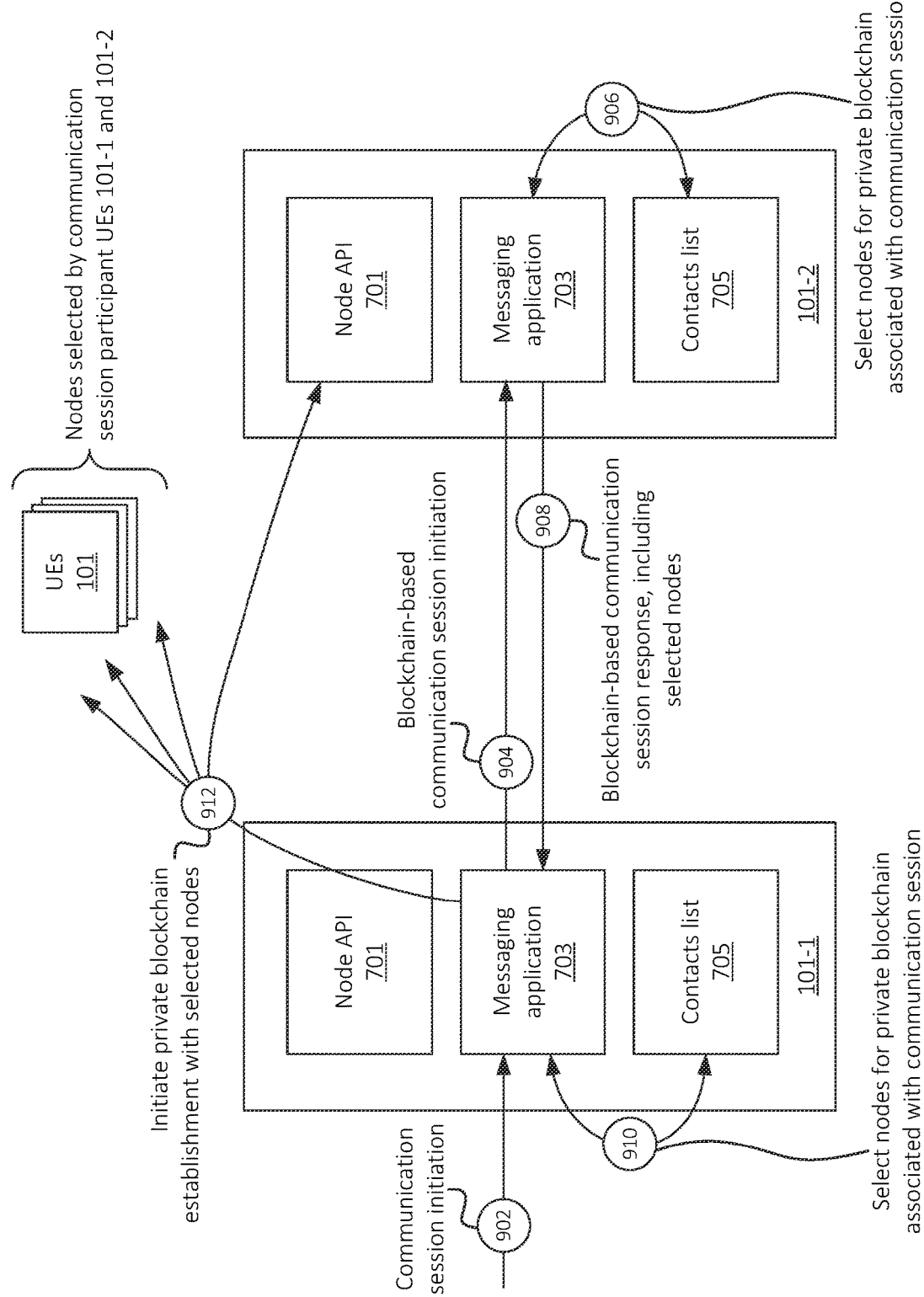
FIGS. 9-11 illustrate examples of collaborative blockchain establishment techniques, in accordance with some embodiments.

UEs 101 may use such information when establishing one or more private blockchain systems 109 associated with respective communication sessions between UEs 101. As shown in FIG. 9, for example, assume that UE 101-1 initiates a communication session with UE 101-2. For example, a user of UE 101-1 may provide (at 902) an instruction to initiate the communication session, such as by providing an identifier of UE 101-2, an identifier of a user or account associated with UE 101-2, etc. to messaging client 201. In some embodiments, the instruction (provided at 902) may include a message to send to UE 101-2, such as "hello" or some other initial message.

For the purposes of this example, assume that a particular private blockchain system 109 has not been previously established for a communication session between UEs 101-1 and 101-2, and/or that such private blockchain system 109 is not currently established. UE 101-1 may accordingly initiate (at 904) a blockchain-based communication session with UE 101-2. For example, messaging client 201 of UE 101-1 may output (at 904) an initiation message to messaging client 201 of UE 101-2. In some embodiments, such initiation message may be a peer-to-peer message sent directly from UE 101-1 to UE 101-2. In some embodiments, such initiation message may be sent via messaging application server 707 and/or some other intermediary device or system. In some embodiments, the initiation message (sent at 904) may include a request to provide at least a particular quantity of nodes 111 for private blockchain system 109, such that a sufficient quorum, consensus, etc. may be provided via private blockchain system 109.

In this example, assume that UE 101-2 is included in contact list 705 of UE 101-1, and contact list 705 indicates that UE 101-2 is a candidate node 111 and/or otherwise supports blockchain-based communication sessions as discussed herein. In other scenarios (e.g., where UE 101-2 is not in contact list 705 of UE 101-1), UE 101-1 (e.g., messaging client 201 of UE 101) may output a message (such as a Rich Communication Services ("RCS") message or other type of message) to UE 101-2, inquiring whether UE 101-2 supports blockchain-based communication sessions. For example, such message may include an inquiry of whether UE 101-2 implements node API 701 and/or is otherwise configured to provide and/or retrieve public keys for key exchange techniques described above. UE 101-2 (e.g., messaging client 201 of UE 101-2) may reply to such message with an affirmative indication that UE 101-2 supports blockchain-based communications, which may be based on UE 101-2 implementing an instance of node API 701 and/or based on messaging client 201 of UE 101-2 otherwise being configured to or capable of accessing a particular private blockchain system 109 that may be established for the communication session between UEs 101-1 and 101-2.

Based on receiving (at 904) the indication that a blockchain-based communication session between UEs 101-1 and 101-2 is being initiated, UE 101-2 may select (at 906) a set of nodes 111 for a particular private blockchain system 109, associated with the communication session. For example, UE 101-2 may select the set of nodes 111 from contact list 705 associated with UE 101-2. The selection may be made on a random basis or on some other suitable basis, from particular UEs 101 included in contact list 705 that are indicated as candidate nodes 111 (e.g., as similarly described above with respect to FIG. 8).

UE 101-2 may respond (at 908) to UE 101-1, including providing an indication of the selected nodes 111 from contact list 705 of UE 101-2. In some embodiments, the indication of the selected nodes 111 from contact list 705 of UE 101-2 may include identifiers of such nodes 111, such as MDNs, IP addresses, and/or other suitable identifiers of respective UEs 101 selected (at 906) by UE 101-2. UE 101-1 may also select (at 910) a set of nodes 111 from contact list 705 of UE 101-1. In some embodiments, although not explicitly shown here, UEs 101-1 and 101-2 may communicate with each other to confirm and/or validate the combined list of selected nodes (e.g., as selected by UEs 101-1 and 101-2).

Once the first set of nodes 111 is received (at 908) from UE 101-2 and the second set of nodes 111 is selected (at 910) by UE 101-1, UE 101-1 may initiate (at 912) the establishment of private blockchain system 109 with the selected nodes 111. For example, as discussed above with respect to FIG. 3, UE 101-1 may output a private blockchain invitation to the other UEs 101 selected as nodes 111 for private blockchain system 109, and the other UEs 101 may join private blockchain system 109. In this manner, as noted above, private blockchain system 109 may include nodes 111 that are trusted or otherwise selected by both participants in the communication session, namely UEs 101-1 and 101-2 in this example.

Situations may arise in which two different UEs 101 attempt to establish private blockchain system 109 simultaneously or near-simultaneously for a communication session between the two different UEs 101. Some embodiments may resolve such simultaneous establishment attempts by including additional information with communication session initiation messages, based on which such UEs 101 may be able to identify a particular one of the UEs 101 to initiate the blockchain establishment procedure (e.g., to invite other UEs 101 to private blockchain system 109).

Figure 10:
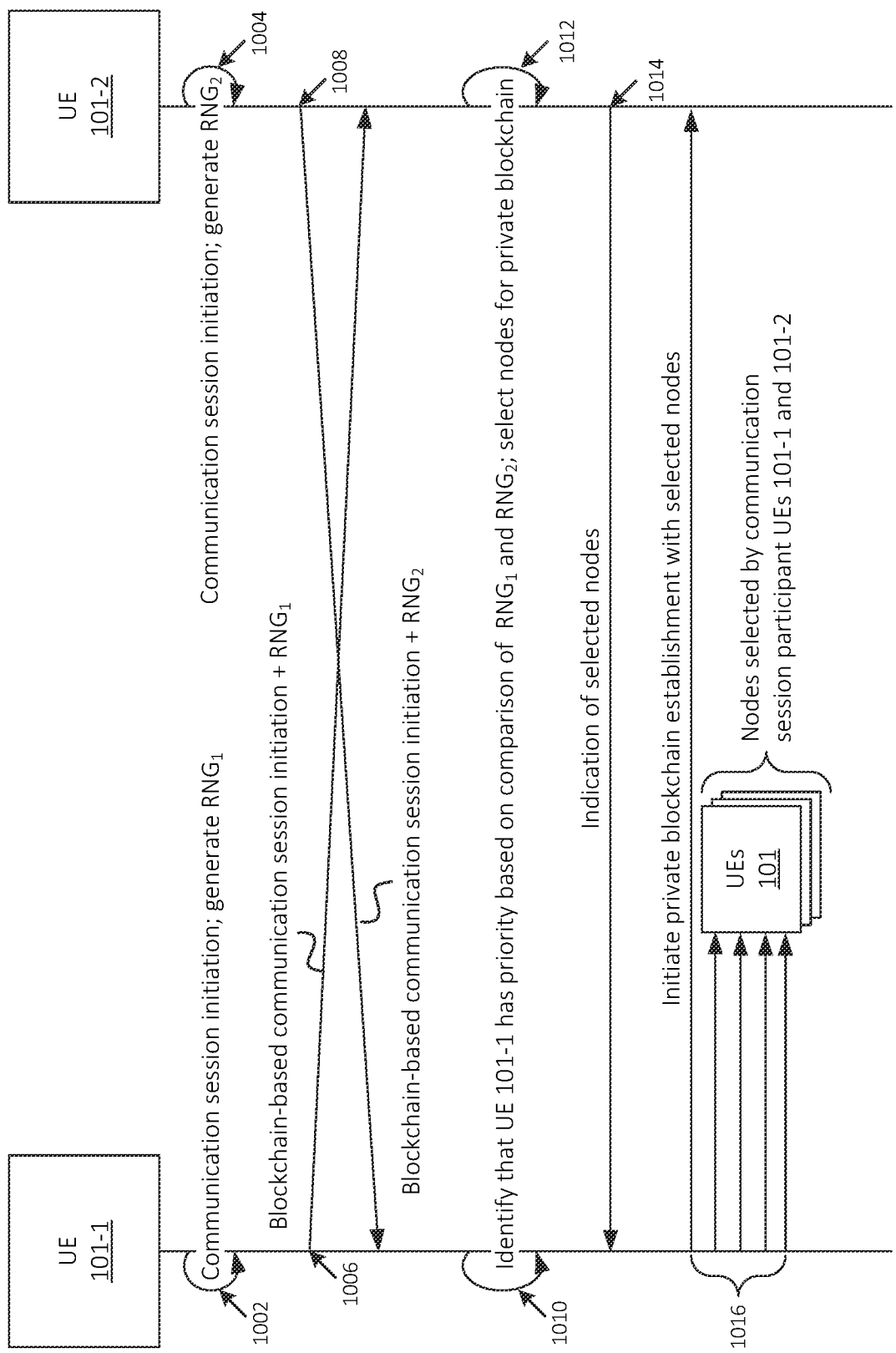

As shown in FIG. 10, for example, UE 101-1 may initiate (at 1002) and/or receive an instruction to initiate a communication session with UE 101-2. For example, a user of UE 101-1 may provide an instruction, outgoing message, or other indication to messaging client 201 of UE 101-1, indicating that a communication session with UE 101-2 should be established. Similarly, at about the same time, UE 101-2 may receive (at 1004) an instruction to initiate a communication session with UE 101-1. In accordance with some embodiments, UEs 101-1 and 101-2 may each generate (at 1002 and 1004, respectively) a random number using random number generation ("RNG") techniques or other suitable techniques. For example, UE 101-1 may generate (at 1002) a first random number $RNG_1$, and UE 101-2 may generate (at 1004) a second random number $RNG_2$. In some embodiments, in situations where UE 101-2 receives (at 1004) one or more messages to send to UE 101-1 via the communication session, UE 101-2 may forgo sending such messages until after a private blockchain system 109, associated with the communication session, has been established. For example, once such private blockchain system 109 has been established, UE 101-2 may encrypt the one or more messages using techniques described above, and may provide one or more keys that may be used to decrypt the one or more messages to private blockchain system 109 (e.g., where UE 101-1 may retrieve such keys from private blockchain system 109).

In some embodiments, the random numbers generated by UEs 101-1 and/or 101-2 may be, include and/or, may be derived from one or more non-random or pseudorandom numbers. For example, in some embodiments, the random number for a particular UE 101 may be generated based on an identifier of the particular UE 101, such as an MDN, an IP address, an IMSI value, and/or some other unique identifier (or some portion thereof, such as the last four digits of the MDN) of the particular UE 101. For example, the identifier of the particular UE 101 may be, or may be included in, a "seed" based on which the random number is generated. Additionally, or alternatively, the identifier of the particular UE 101 may be appended to, prepended to, and/or otherwise incorporated in a randomly generated number. For example, in such instances, the randomly generated numbers may include a random number component and an identifier component. As one example, assume that the last four digits of the MDN of UE 101-1 are 9999 and that UE 101-1 generates a random number 12345. In some embodiments, in this example, $RNG_1$ may be 1234599999 (e.g., the last four digits of the MDN appended to the randomly generated number), 99991234 (e.g., the last four digits of the MDN prepended to the randomly generated number), 19293949 (e.g., the last four digits of the MDN dispersed within the randomly generated number in a preset pattern), 91239949 (e.g., the last four digits of the MDN dispersed within the randomly generated number in a random order), etc. In this manner, since the randomly generated numbers include and/or otherwise based on unique identifiers of the participant UEs 101, the randomly generated numbers may be relatively unlikely or impossible to be the same, thus eliminating potential ambiguity.

Based on the initiation (at 1002) of the communication session, at UE 101-1, between UEs 101-1 and 101-2 (e.g., based on a user selection via messaging client 201 at UE 101-1), UE 101-1 may output (at 1006 a blockchain-based communication session initiation message to UE 101-2, as similarly discussed above. For example, the initiation message may indicate that UE 101-2 should select one or more nodes 111 to maintain private blockchain system 109 associated with the communication session between UEs 101-1 and 101-2, and/or may include a request for a particular quantity of nodes 111 (or at least the particular quantity). In some embodiments, the initiation message may also include $RNG_1$, as generated (at 1002) by UE 101-1.

Prior to receiving or otherwise identifying the receipt of the initiation message from UE 101-1, UE 101-2 may output (at 1008) a blockchain-based communication session initiation message to UE 101-1, including $RNG_2$ as generated (at 1004) by UE 101-2. For example, due to transmission and/or processing delay, UE 101-2 may not have received the initiation message from UE 101-1. Thus, at this stage, both UEs 101-1 and 101-2 may each be attempting to establish a separate instance of private blockchain system 109 for a communication session between the same active participants (i.e., participant UEs 101-1 and 101-2).

In some embodiments, the blockchain-based communication session initiation message may be distinct from a blockchain-based communication session initiation response (e.g., at 908 in FIG. 9). For example, the blockchain-based communication session initiation message (e.g., as provided at 1006 and 1008) may include a first message type identifier, code, etc., while the blockchain-based communication session initiation response (e.g., at 908 in FIG. 9) may include a second message type identifier, code, etc. In this manner, UEs 101-1 and 101-2 may be able to differentiate between the two different types of messages.

UEs 101-1 and 101-2 may both identify (at 1010 and 1012, respectively) that UE 101-1 has priority to establish private blockchain system 109 for the communication session between UEs 101-1 and 101-2. For example, in some embodiments, UEs 101-1 and 101-2 may each compare (at 1010 and 1012, respectively) $RNG_1$ and $RNG_2$, and may select the same particular UE (i.e., UE 101-1 in this example) to initiate the establishment of private blockchain system 109 (e.g., to invite other nodes 111). For example, UEs 101-1 and 101-2 may be configured to select the lowest value between $RNG_1$ and $RNG_2$ or, in some embodiments, the highest value between $RNG_1$ and $RNG_2$. In some embodiments, UEs 101-1 and 101-2 may perform one or more functions (e.g., the same one or more functions) on $RNG_1$ and/or $RNG_2$, based on which UEs 101-1 and 101-2 may select the same particular UE (i.e., UE 101-1 in this example) to initiate the establishment of private blockchain system 109.

Since UE 101-1 has received (at 1008) an initiation message from UE 101-2, UE 101-1 may forgo outputting a request for nodes 111 from UE 101-2 and/or may forgo outputting an inquiry of whether UE 101-2 supports blockchain-based communications, as the initiation message may indicate that UE 101-2 supports blockchain-based communications. Accordingly, UE 101-1 may select (at 1010) one or more nodes 111 to participate in private blockchain system 109 (e.g., from contact list 705 associated with UE 101-1, as discussed above).

Further, since UE 101-2 has received (at 1006) the initiation message from UE 101-1 and has determined (at 1012) that UE 101-1 has priority to establish private blockchain system 109 associated with the communication session (e.g., based on the comparison of the randomly generated numbers provided by UEs 101-1 and 101-2), UE 101-2 may select one or more nodes 111 to participate in private blockchain system 109 e.g., from contact list 705 associated with UE 101-2, as discussed above). UE 101-2 may further provide (at 1014) an indication of the nodes 111 selected (at 1012) by UE 101-2, and UE 101-1 may proceed to initiate (at 1016) the establishment of private blockchain system 109 associated with the communication session in a manner similarly discussed above.

Figure 11:
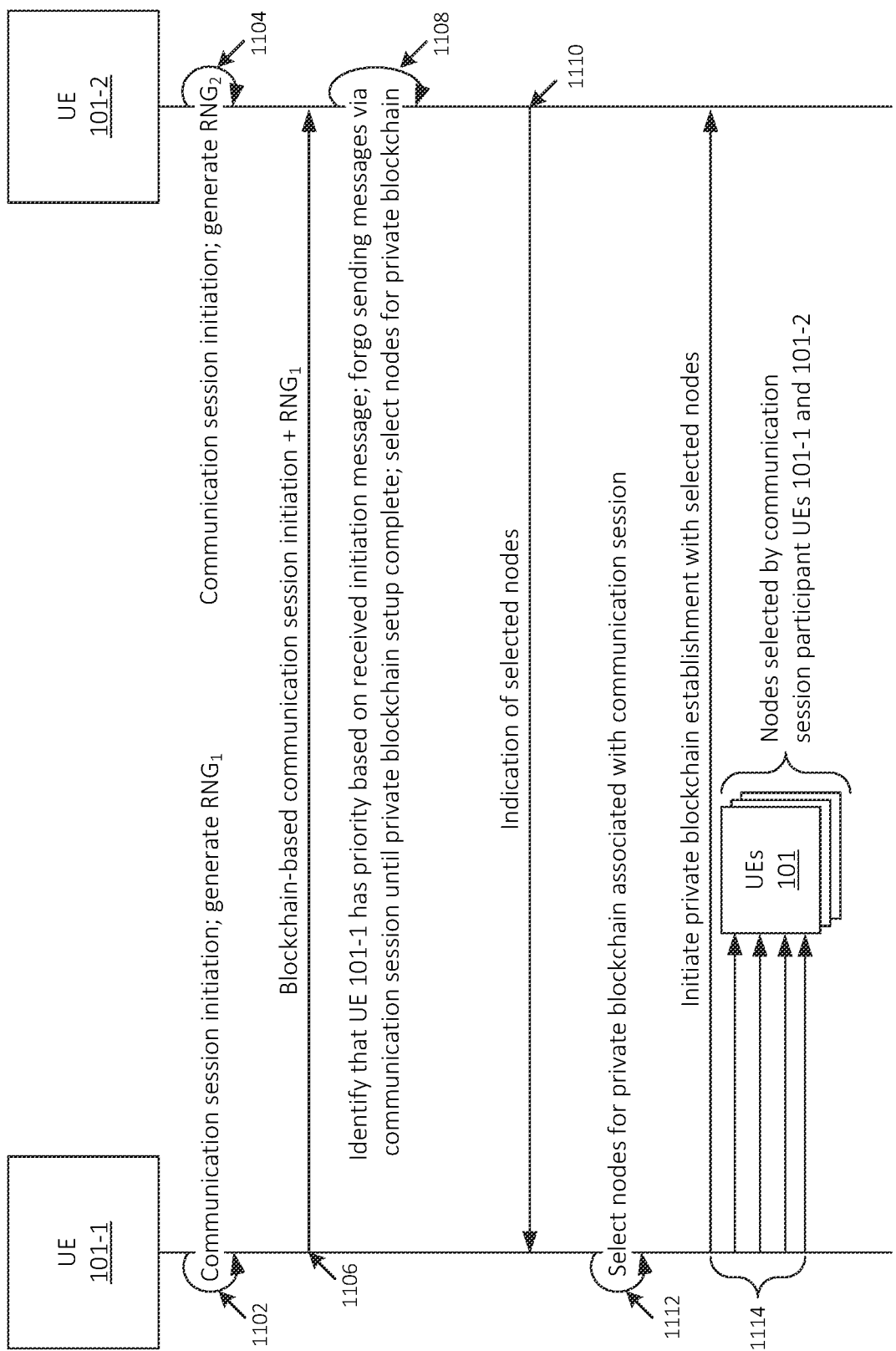

FIG. 11 illustrates an example situation in which a communication session is simultaneously (or nearly simultaneously) initiated (at 1102 and 1104) at different UEs 101 (i.e., UEs 101-1 and 101-2, in this example). In this example, UE 101-2 may receive (at 1106) a blockchain-based communication session initiation message, as well as a randomly generated number (e.g., $RNG_1$) from UE 101-1 prior to outputting a blockchain-based communication session initiation message to UE 101-1. For example, such a circumstance may occur when UE 101-2 is processing the communication session initiation (at 1104), when UE 101-2 is in the midst of generating a blockchain-based communication session initiation message for UE 101-1, and/or otherwise before UE 101-2 sends a blockchain-based communication session initiation message for UE 101-1 (e.g., as performed at 1008 in FIG. 10). For example, a user of UE 101-2 may select, via messaging client 201 of UE 101-2, an option to send a message to UE 101-1 (but may not yet have entered the message and/or may not yet have selected a "send" option) or may otherwise indicate that a communication session should be established with UE 101-1.

As such, even though UE 101-2 has received (at 1104) a selection to initiate a communication with UE 101-1, UE 101-2 may forgo outputting a blockchain-based communication session initiation message for UE 101-1 based on receiving (at 1106) the blockchain-based communication session initiation message from UE 101-1. UE 101-2 may identify that UE 101-1 has priority to establish private blockchain system 109 for the communication session between UEs 101-1 and 101-2, based on the receipt (at 1106) of the blockchain-based communication session initiation message from UE 101-1 and further based on forgoing outputting such message to UE 101-2. That is, in this instance, there may not be the potential ambiguity introduced by the simultaneous or near-simultaneous sending of blockchain-based communication session initiation messages (e.g., as shown in FIG. 10 at 1006 and 1008). Accordingly, even though the blockchain-based communication session initiation message from UE 101-1 included a randomly generated number (e.g., $RNG_1$) and UE 101-2 generated (at 1104) a randomly generated number (e.g., $RNG_2$), UEs 101-1 and 101-2 may forgo using the randomly generated numbers to determine which UE 101 has priority to establish private blockchain system 109.

UE 101-2 may accordingly select (at 1108) nodes 111 for private blockchain system 109, and may output (at 1110) an indication of the selected nodes 111 to UE 101-1. UE 101-1 may also select (at 1112) another set of nodes 111 for private blockchain system 109, and may initiate (at 1114) the establishment of private blockchain system 109 with nodes 111 selected (at 1108 and 1112) by UEs 101-1 and 101-2.

Figure 12:
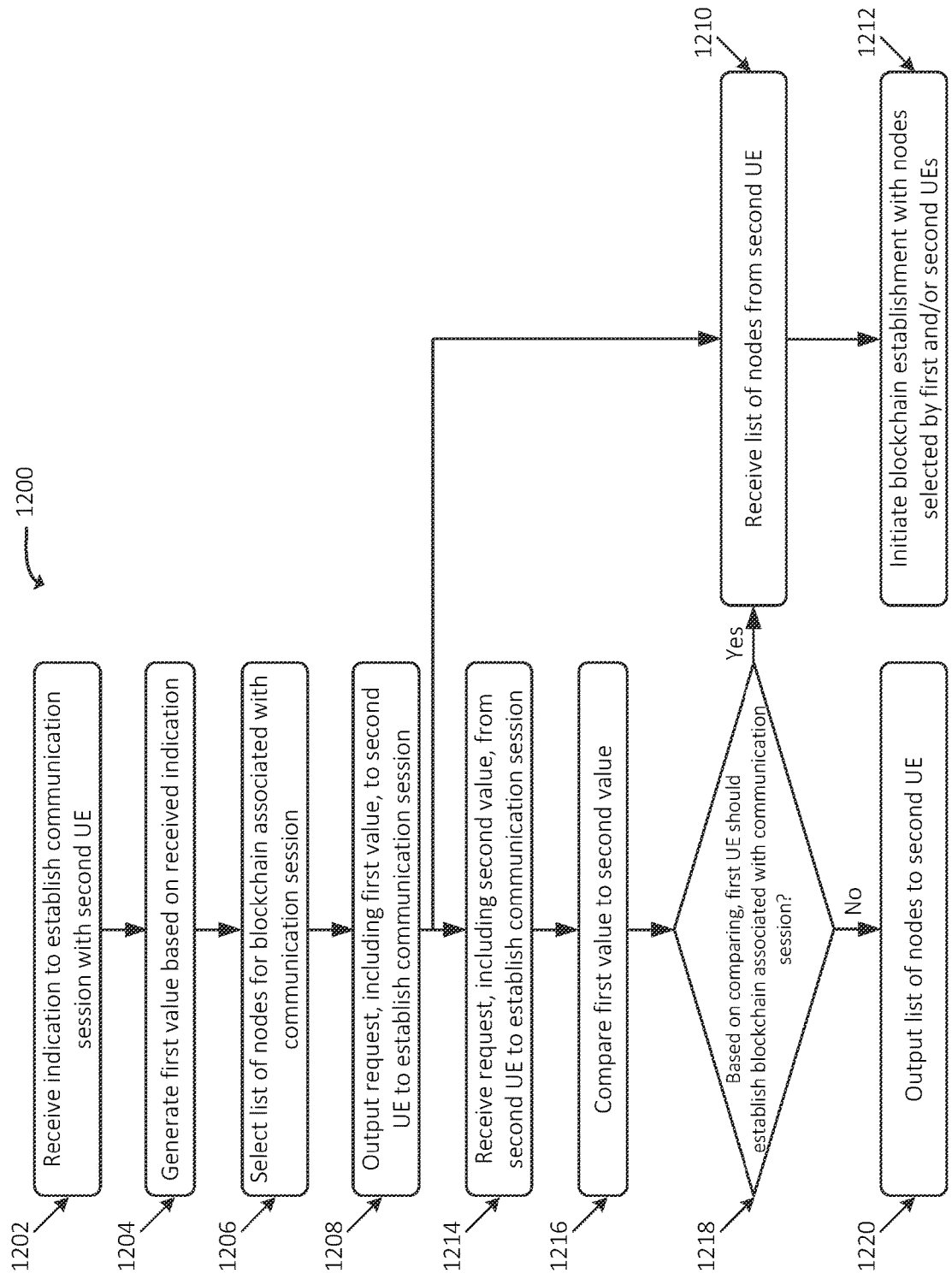
FIG. 12 illustrates an example process for collaborative blockchain establishment techniques, in accordance with some embodiments.

FIG. 12 illustrates an example process 1200 for collaboratively establishing a private blockchain system 109 associated with a communication session between respective participant UEs 101. In some embodiments, some or all of process 1200 may be performed by a particular UE 101 (e.g., a particular participant in the communication session, referred to below as a first UE 101-1).

As shown, process 1200 may include receiving (at 1202) an indication to establish a communication session with a second UE 101-2. For example, UE 101-1 may receive an indication from a user and/or some other indication via messaging client 201 associated with UE 101-1 that one or more messages should be sent to UE 101-2.

Process 1200 may also include generating (at 1204) a first value based on the received indication. For example, UE 101-1 may generate a randomly generated number. As discussed above, the randomly generated number may include and/or may be based on a non-random value, such as a unique identifier of UE 101-1 (e.g., an IP address, an MDN, an IMSI value, etc.). In some embodiments, the first value may be a non-random value, such as the unique identifier of UE 101-1 and/or some other type of non-random value. In some embodiments, UE 101-1 may perform one or more other operations associated with the communication session, such as generating one or more keys which may be used to encrypt and/or decrypt messages associated with the communication session, as discussed above.

Process 1200 may further include selecting (at 1206) a set of nodes 111 to participate in private blockchain system 109 associated with the communication session. For example, as discussed above, UE 101-1 may select one or more contacts, UEs 101, etc. from contact list 705 associated with UE 101-1. In some embodiments, as discussed above, UE 101-1 may select from contacts for which UE 101-1 maintains or receives information that such contacts are eligible, available, opted in, etc. for participation in private blockchain system 109 (e.g., to receive, maintain, and provide records including keys associated with the communication session).

Process 1200 may further include outputting (at 1208) a request, including the first value, to the second UE 101-2. The request may include a request to establish the communication session. In some embodiments, the request may include and/or may be based on an inquiry to the second UE 101-2, inquiring whether UE 101-2 supports blockchain-based communication sessions (e.g., a blockchain-based key exchange as described above). In some embodiments, the request may include an indication or instruction that a blockchain-based key exchange will be associated with the communication session. In some embodiments, the request may include a request to provide information regarding nodes 111, selected by UE 101-2, to participate in private blockchain system 109 associated with the communication session. In some embodiments, the request may specify a particular quantity of nodes to provide in order to establish a quorum, consensus, etc. associated with private blockchain system 109.

As discussed above, the first UE 101-1 may receive one or more different types of responses from the second UE 101-2. For example, the varied responses may be based on whether UE 101-2 is simultaneously attempting to initiate a communication session with UE 101-1 (e.g., a separate attempt to establish the same communication session with the same active participants). In the event that UE 101-2 is not attempting to simultaneously initiate a communication session with UE 101-1, UE 101-1 may receive (at 1210) a response from UE 101-2, including a list of nodes 111 to participate in private blockchain system 109 associated with the communication session. As discussed above, the list of nodes 111 received from UE 101-2 may have been selected by UE 101-2, such as from contact list 705 associated with UE 101-2.

Process 1200 may additionally include initiating (at 1212) a blockchain establishment procedure with nodes 111 selected by UEs 101-1 and/or UE 101-2. For example, as discussed above, UE 101-1 may output invitation messages and/or one or more other types of messages to the selected nodes 111. In some embodiments, UE 101-1 may perform one or more other operations relating to the establishment of private blockchain system 109, such as generating, validating, signing, providing, etc. a genesis block of private blockchain system 109 to nodes 111.

As discussed above, in other situations, UE 101-2 may have not received the request (provided at 1208) prior to outputting a request of its own to UE 101-1. For example, such situations may occur when the request (at 1208) from UE 101-1 has not been received, processed, etc. by UE 101-2 prior to UE 101-2 outputting the request to UE 101-1. As such, UE 101-1 may receive (at 1214) the request, including a second value (e.g., a second randomly generated value and/or some other value) from UE 101-2, to establish the communication session.

Based on determining that UE 101-2 has requested the same communication session, having the same active participant UEs 101-1 and 101-2 (e.g., in lieu of providing a response message to the request from UE 101-1), UE 101-1 may compare (at 1216) the first value to the second value. Similarly, UE 101-2 may also compare the first value to the second value. Based on the comparing, UE 101-1 (and/or UE 101-2) may determine (at 1218) whether the first UE 101-1 should establish private blockchain system 109 associated with the communication session. For example, UEs 101-1 and 101-2 may both use the same criteria, logic, functions, etc. to compare the first and second values and determine which UE 101 should establish private blockchain system 109.

If, based on the comparing, the first UE 101-1 should establish private blockchain system 109 (at 1218—YES), UE 101-1 may receive (at 1210) a list of nodes 111 from UE 101-2. For example, as discussed above, UE 101-2 may select the list of nodes 111 based on determining that the first UE 101-1 should establish private blockchain system 109. UE 101-1 may then proceed to initiate (at 1212) the establishment of private blockchain system 109 with the nodes 111 selected by UEs 101-1 and/or 101-2.

If, on the other hand, based on the comparing, the first UE 101-1 should not establish private blockchain system 109 (at 1218—NO), then UE 101-1 may output (at 1220) the list of nodes (selected by UE 101-1 at 1206) to UE 101-2. In this situation, UE 101-2 may initiate the establishment of private blockchain system 109 with the nodes 111 selected by UEs 101-1 and/or 101-2. Once private blockchain system 109 is established, UEs 101-1 and 101-2 may proceed to send encrypted messages to each other via the communication session, and may provide keys (e.g., public keys) to private blockchain system 109 along with communication session identifiers, such that UEs 101-1 and 101-2 may be able to retrieve keys provided by each other and decrypt the encrypted messages (e.g., using a double ratchet technique or other suitable encryption technique).

Figure 13:
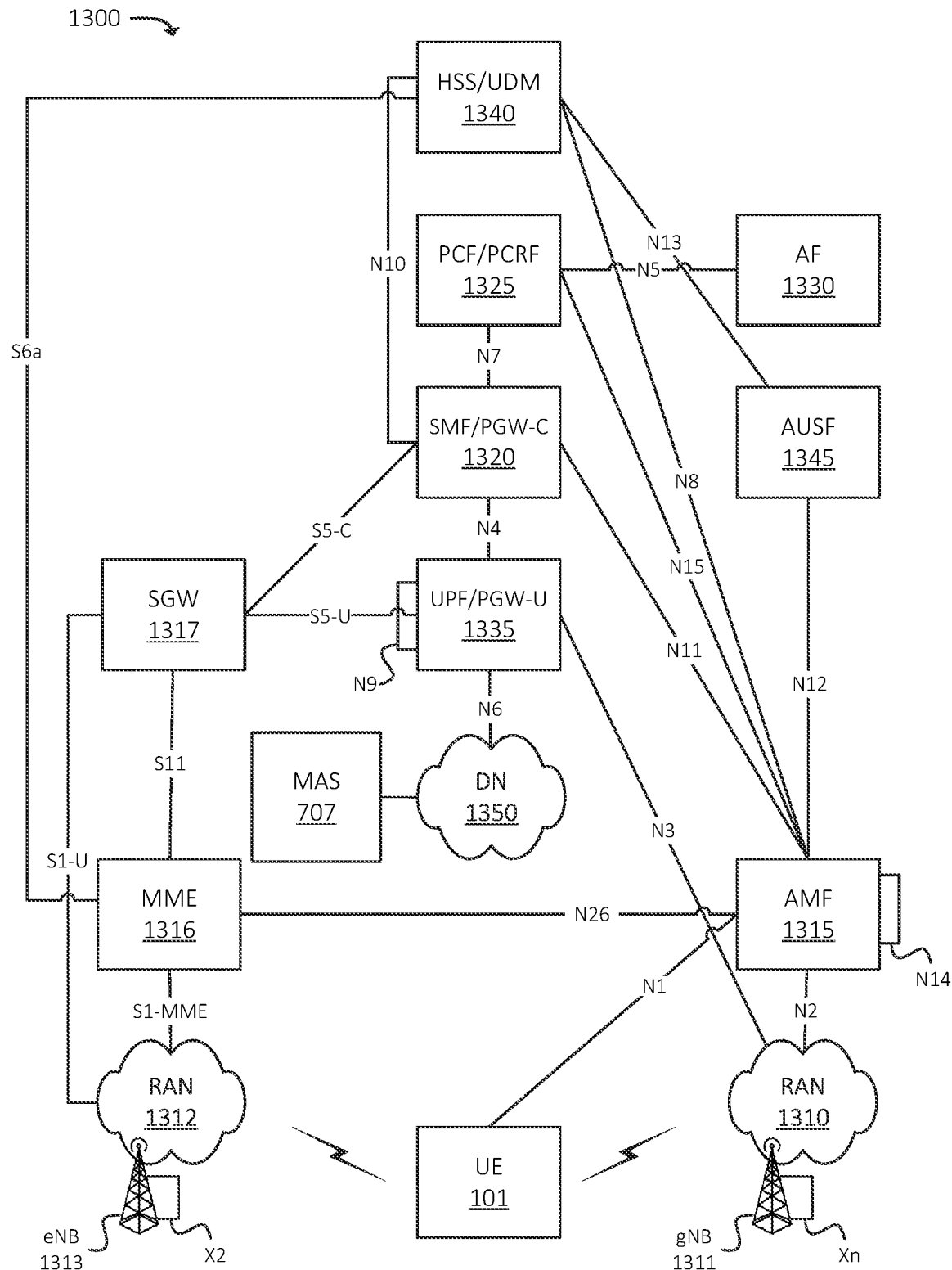
FIG. 13 illustrates an example environment in which one or more embodiments, described herein, may be implemented.

FIG. 13 illustrates an example environment 1300, in which one or more embodiments may be implemented. In some embodiments, environment 1300 may correspond to a Fifth Generation ("5G") network, and/or may include elements of a 5G network. In some embodiments, environment 1300 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1300 may include UE 101, RAN 1310 (which may include one or more Next Generation Node Bs ("gNBs") 1311), RAN 1312 (which may include one or more evolved Node Bs ("eNBs") 1313), and various network functions such as Access and Mobility Management Function ("AMF") 1315, Mobility Management Entity ("MME") 1316, Serving Gateway ("SGW") 1317, Session Management Function ("SMF")/Packet Data Network ("PDN") Gateway ("PGW")-Control plane function ("PGW-C") 1320, Policy Control Function ("PCF")/Policy Charging and Rules Function ("PCRF") 1325, Application Function ("AF") 1330, User Plane Function ("UPF")/PGW-User plane function ("PGW-U") 1335, Home Subscriber Server ("HSS")/Unified Data Management ("UDM") 1340, Authentication Server Function ("AUSF") 1345, and messaging application server 707. Environment 1300 may also include one or more networks, such as Data Network ("DN") 1350.

The example shown in FIG. 13 illustrates one instance of each network component or function (e.g., one instance of SMF/PGW-C 1320, PCF/PCRF 1325, UPF/PGW-U 1335, HSS/UDM 1340, and/or AUSF 1345). In practice, environment 1300 may include multiple instances of such components or functions. For example, in some embodiments, environment 1300 may include multiple "slices" of a core network, where each slice includes a discrete set of network functions (e.g., one slice may include a first instance of SMF/PGW-C 1320, PCF/PCRF 1325, UPF/PGW-U 1335, HSS/UDM 1340, and/or AUSF 1345, while another slice may include a second instance of SMF/PGW-C 1320, PCF/PCRF 1325, UPF/PGW-U 1335, HSS/UDM 1340, and/or AUSF 1345). The different slices may provide differentiated levels of service, such as service in accordance with different Quality of Service ("QoS") parameters.

The quantity of devices and/or networks, illustrated in FIG. 13, is provided for explanatory purposes only. In practice, environment 1300 may include additional devices and/or networks, fewer devices and/or networks, different devices and/or networks, or differently arranged devices and/or networks than illustrated in FIG. 13. For example, while not shown, environment 1300 may include devices that facilitate or enable communication between various components shown in environment 1300, such as routers, modems, gateways, switches, hubs, etc. Alternatively, or additionally, one or more of the devices of environment 1300 may perform one or more network functions described as being performed by another one or more of the devices of environment 1300. Devices of environment 1300 may interconnect with each other and/or other devices via wired connections, wireless connections, or a combination of wired and wireless connections. In some implementations, one or more devices of environment 1300 may be physically integrated in, and/or may be physically attached to, one or more other devices of environment 1300.

UE 101 may include a computation and communication device, such as a wireless mobile communication device that is capable of communicating with RAN 1310, RAN 1312, and/or DN 1350. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Machine-to-Machine ("M2M") device, or another type of mobile computation and communication device. UE 101 may send traffic to and/or receive traffic (e.g., user plane traffic) from DN 1350 via RAN 1310, RAN 1312, and/or UPF/PGW-U 1335. In some embodiments, as discussed above, a group of UEs 101 may implement, maintain, interact with, access, etc. one or more private blockchain systems 109 (e.g., where different private blockchain systems 109 may be associated with different communication sessions between different UEs 101).

RAN 1310 may be, or may include, a 5G RAN that includes one or more base stations (e.g., one or more gNBs 1311), via which UE 101 may communicate with one or more other elements of environment 1300. UE 101 may communicate with RAN 1310 via an air interface (e.g., as provided by gNB 1311). For instance, RAN 1310 may receive traffic (e.g., voice call traffic, data traffic, messaging traffic, signaling traffic, etc.) from UE 101 via the air interface, and may communicate the traffic to UPF/PGW-U 1335, and/or one or more other devices or networks. Similarly, RAN 1310 may receive traffic intended for UE 101 (e.g., from UPF/PGW-U 1335, AMF 1315, and/or one or more other devices or networks) and may communicate the traffic to UE 101 via the air interface.

RAN 1312 may be, or may include, a LTE RAN that includes one or more base stations (e.g., one or more eNBs 1313), via which UE 101 may communicate with one or more other elements of environment 1300. UE 101 may communicate with RAN 1312 via an air interface (e.g., as provided by eNB 1313). For instance, RAN 1310 may receive traffic (e.g., voice call traffic, data traffic, messaging traffic, signaling traffic, etc.) from UE 101 via the air interface, and may communicate the traffic to UPF/PGW-U 1335, and/or one or more other devices or networks. Similarly, RAN 1310 may receive traffic intended for UE 101 (e.g., from UPF/PGW-U 1335, SGW 1317, and/or one or more other devices or networks) and may communicate the traffic to UE 101 via the air interface.

AMF 1315 may include one or more devices, systems, Virtualized Network Functions ("VNFs"), etc., that perform operations to register UE 101 with the 5G network, to establish bearer channels associated with a session with UE 101, to hand off UE 101 from the 5G network to another network, to hand off UE 101 from the other network to the 5G network, manage mobility of UE 101 between RANs 1310 and/or gNBs 1311, and/or to perform other operations. In some embodiments, the 5G network may include multiple AMFs 1315, which communicate with each other via the N14 interface (denoted in FIG. 13 by the line marked "N14" originating and terminating at AMF 1315).

MME 1316 may include one or more devices, systems, VNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 1312 and/or eNBs 1313, and/or to perform other operations.

SGW 1317 may include one or more devices, systems, VNFs, etc., that aggregate traffic received from one or more eNBs 1313 and send the aggregated traffic to an external network or device via UPF/PGW-U 1335. Additionally, SGW 1317 may aggregate traffic received from one or more UPF/PGW-Us 1335 and may send the aggregated traffic to one or more eNBs 1313. SGW 1317 may operate as an anchor for the user plane during inter-eNB handovers and as an anchor for mobility between different telecommunication networks or RANs (e.g., RANs 1310 and 1312).

SMF/PGW-C 1320 may include one or more devices, systems, VNFs, etc., that gather, process, store, and/or provide information in a manner described herein. SMF/PGW-C 1320 may, for example, facilitate the establishment of communication sessions on behalf of UE 101. In some embodiments, the establishment of communications sessions may be performed in accordance with one or more policies provided by PCF/PCRF 1325.

PCF/PCRF 1325 may include one or more devices, systems, VNFs, etc., that aggregate information to and from the 5G network and/or other sources. PCF/PCRF 1325 may receive information regarding policies and/or subscriptions from one or more sources, such as subscriber databases and/or from one or more users (such as, for example, an administrator associated with PCF/PCRF 1325).

AF 1330 may include one or more devices, systems, VNFs, etc., that receive, store, and/or provide information that may be used in determining parameters (e.g., quality of service parameters, charging parameters, or the like) for certain applications.

UPF/PGW-U 1335 may include one or more devices, systems, VNFs, etc., that receive, store, and/or provide data (e.g., user plane data). For example, UPF/PGW-U 1335 may receive user plane data (e.g., voice call traffic, data traffic, etc.), destined for UE 101, from DN 1350, and may forward the user plane data toward UE 101 (e.g., via RAN 1310, SMF/PGW-C 1320, and/or one or more other devices). In some embodiments, multiple UPFs 1335 may be deployed (e.g., in different geographical locations), and the delivery of content to UE 101 may be coordinated via the N9 interface (e.g., as denoted in FIG. 13 by the line marked "N9" originating and terminating at UPF/PGW-U 1335). Similarly, UPF/PGW-U 1335 may receive traffic from UE 101 (e.g., via RAN 1310, SMF/PGW-C 1320, and/or one or more other devices), and may forward the traffic toward DN 1350. In some embodiments, UPF/PGW-U 1335 may communicate (e.g., via the N4 interface) with SMF/PGW-C 1320, regarding user plane data processed by UPF/PGW-U 1335.

HSS/UDM 1340 and AUSF 1345 may include one or more devices, systems, VNFs, etc., that manage, update, and/or store, in one or more memory devices associated with AUSF 1345 and/or HSS/UDM 1340, profile information associated with a subscriber. AUSF 1345 and/or HSS/UDM 1340 may perform authentication, authorization, and/or accounting operations associated with the subscriber and/or a communication session with UE 101.

DN 1350 may include one or more wired and/or wireless networks. For example, DN 1350 may include an Internet Protocol IP-based PDN, a wide area network ("WAN") such as the Internet, a private enterprise network, and/or one or more other networks. UE 101 may communicate, through DN 1350, with data servers, other UEs 101, and/or to other servers or applications that are coupled to DN 1350. DN 1350 may be connected to one or more other networks, such as a public switched telephone network ("PSTN"), a public land mobile network ("PLMN"), and/or another network. DN 1350 may be connected to one or more devices, such as content providers, applications, web servers, and/or other devices, with which UE 101 may communicate.

Figure 14:
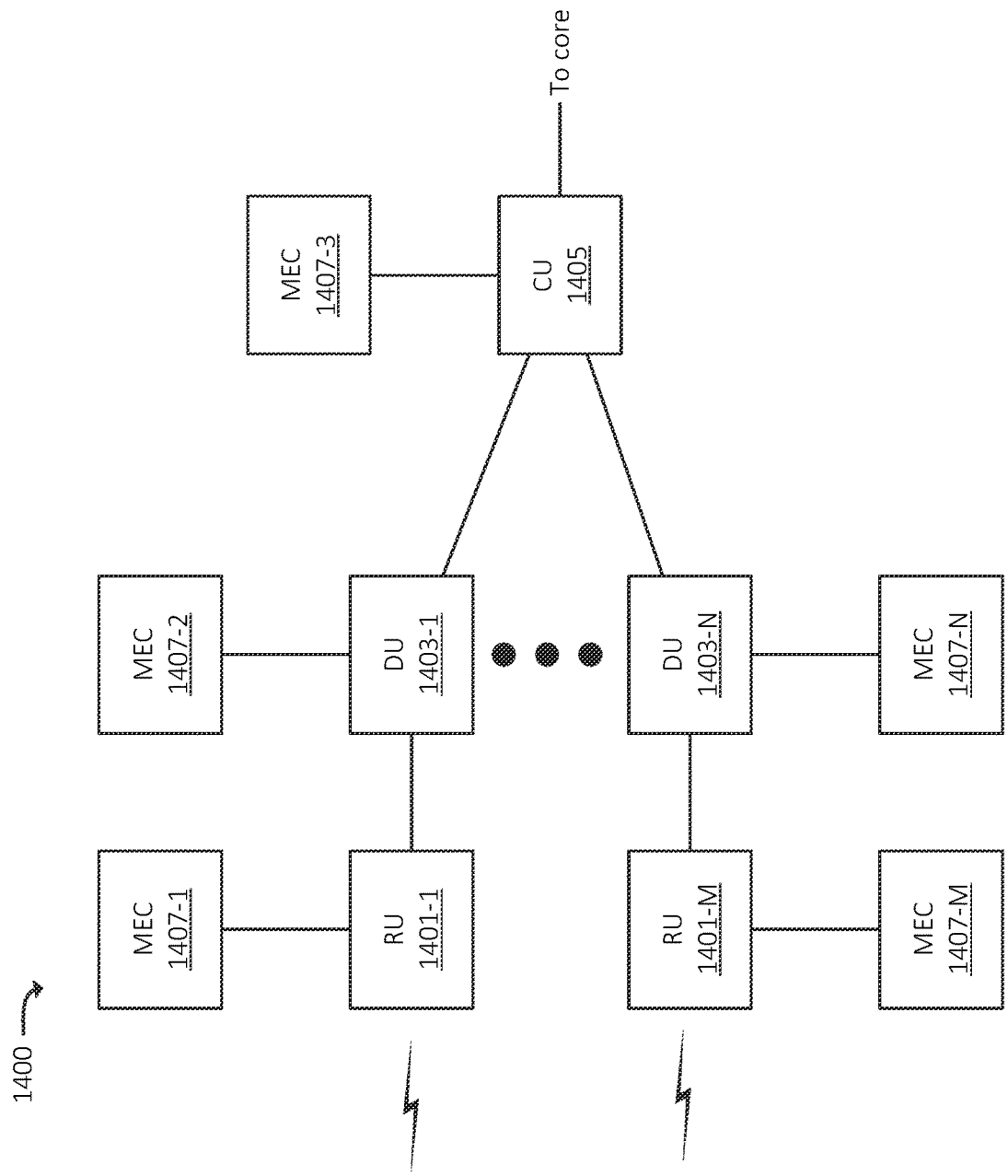
FIG. 14 illustrates an example arrangement of a radio access network ("RAN"), in accordance with some embodiments.

FIG. 14 illustrates an example Distributed Unit ("DU") network 1400, which may be included in and/or implemented by one or more RANs (e.g., RAN 1310, RAN 1312, or some other RAN). In some embodiments, a particular RAN may include one DU network 1400. In some embodiments, a particular RAN may include multiple DU networks 1400. In some embodiments, DU network 1400 may correspond to a particular gNB 1311 of a 5G RAN (e.g., RAN 1310). In some embodiments, DU network 1400 may correspond to multiple gNBs 1311. In some embodiments, DU network 1400 may correspond to one or more other types of base stations of one or more other types of RANs. As shown, DU network 1400 may include Centralized Unit ("CU") 1405, one or more Distributed Units ("DUs") 1403-1 through 1403-N (referred to individually as "DU 1403," or collectively as "DUs 1403"), and one or more Radio Units ("RUs") 1401-1 through 1401-M (referred to individually as "RU 1401," or collectively as "RUs 1401").

CU 1405 may communicate with a core of a wireless network (e.g., may communicate with one or more of the devices or systems described above with respect to FIG. 13, such as AMF 1315 and/or UPF/PGW-U 1335). In the uplink direction (e.g., for traffic from UEs 101 to a core network), CU 1405 may aggregate traffic from DUs 1403, and forward the aggregated traffic to the core network. In some embodiments, CU 1405 may receive traffic according to a given protocol (e.g., Radio Link Control ("RLC")) from DUs 1403, and may perform higher-layer processing (e.g., may aggregate/process RLC packets and generate Packet Data Convergence Protocol ("PDCP") packets based on the RLC packets) on the traffic received from DUs 1403.

In accordance with some embodiments, CU 1405 may receive downlink traffic (e.g., traffic from the core network) for a particular UE 101, and may determine which DU(s) 1403 should receive the downlink traffic. DU 1403 may include one or more devices that transmit traffic between a core network (e.g., via CU 1405) and UE 101 (e.g., via a respective RU 1401). DU 1403 may, for example, receive traffic from RU 1401 at a first layer (e.g., physical ("PHY") layer traffic, or lower PHY layer traffic), and may process/aggregate the traffic to a second layer (e.g., upper PHY and/or RLC). DU 1403 may receive traffic from CU 1405 at the second layer, may process the traffic to the first layer, and provide the processed traffic to a respective RU 1401 for transmission to UE 101.

RU 1401 may include hardware circuitry (e.g., one or more RF transceivers, antennas, radios, and/or other suitable hardware) to communicate wirelessly (e.g., via an RF interface) with one or more UEs 101, one or more other DUs 1403 (e.g., via RUs 1401 associated with DUs 1403), and/or any other suitable type of device. In the uplink direction, RU

1401 may receive traffic from UE 101 and/or another DU 1403 via the RF interface and may provide the traffic to DU 1403. In the downlink direction, RU 1401 may receive traffic from DU 1403, and may provide the traffic to UE 101 and/or another DU 1403.

RUs 1401 may, in some embodiments, be communicatively coupled to one or more Multi-Access/Mobile Edge Computing ("MEC") devices, referred to sometimes herein simply as "MECs" 1407. For example, RU 1401-1 may be communicatively coupled to MEC 1407-1, RU 1401-M may be communicatively coupled to MEC 1407-M, DU 1403-1 may be communicatively coupled to MEC 1407-2, DU 1403-N may be communicatively coupled to MEC 1407-N, CU 1405 may be communicatively coupled to MEC 1407-3, and so on. MECs 1407 may include hardware resources (e.g., configurable or provisionable hardware resources) that may be configured to provide services and/or otherwise process traffic to and/or from UE 101, via a respective RU 1401.

For example, RU 1401-1 may route some traffic, from UE 101, to MEC 1407-1 instead of to a core network (e.g., via DU 1403 and CU 1405). MEC 1407-1 may process the traffic, perform one or more computations based on the received traffic, and may provide traffic to UE 101 via RU 1401-1. In this manner, ultra-low latency services may be provided to UE 101, as traffic does not need to traverse DU 1403, CU 1405, and an intervening backhaul network between DU network 1400 and the core network. In some embodiments, MEC 1407 may include, and/or may implement, some or all of the functionality described above with respect to one or more nodes 111.

Figure 15:
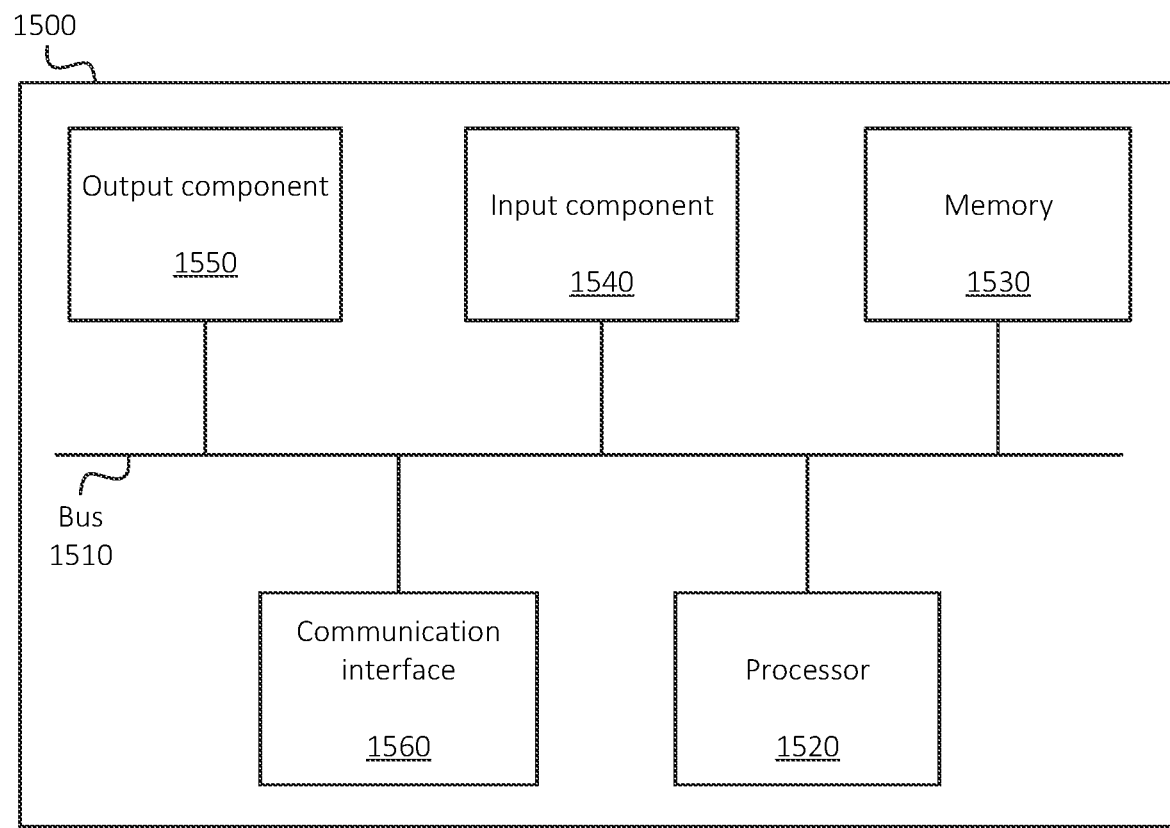
FIG. 15 illustrates example components of one or more devices, in accordance with one or more embodiments described herein.

FIG. 15 illustrates example components of device 1500. One or more of the devices described above may include one or more devices 1500. Device 1500 may include bus 1510, processor 1520, memory 1530, input component 1540, output component 1550, and communication interface 1560. In another implementation, device 1500 may include additional, fewer, different, or differently arranged components.

Bus 1510 may include one or more communication paths that permit communication among the components of device 1500. Processor 1520 may include a processor, microprocessor, or processing logic that may interpret and execute instructions. In some embodiments, processor 1520 may be or may include one or more hardware processors. Memory 1530 may include any type of dynamic storage device that may store information and instructions for execution by processor 1520, and/or any type of non-volatile storage device that may store information for use by processor 1520.

Input component 1540 may include a mechanism that permits an operator to input information to device 1500 and/or other receives or detects input from a source external to 1540, such as a touchpad, a touchscreen, a keyboard, a keypad, a button, a switch, a microphone or other audio input component, etc. In some embodiments, input component 1540 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1550 may include a mechanism that outputs information to the operator, such as a display, a speaker, one or more light emitting diodes ("LEDs"), etc.

Communication interface 1560 may include any transceiver-like mechanism that enables device 1500 to communicate with other devices and/or systems. For example, communication interface 1560 may include an Ethernet interface, an optical interface, a coaxial interface, or the like. Communication interface 1560 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1500 may include more than one communication interface 1560. For instance, device 1500 may include an optical interface and an Ethernet interface.

Device 1500 may perform certain operations relating to one or more processes described above. Device 1500 may perform these operations in response to processor 1520 executing software instructions stored in a computer-readable medium, such as memory 1530. A computer-readable medium may be defined as a non-transitory memory device. A memory device may include space within a single physical memory device or spread across multiple physical memory devices. The software instructions may be read into memory 1530 from another computer-readable medium or from another device. The software instructions stored in memory 1530 may cause processor 1520 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-12), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A first device, comprising:
   one or more hardware processors configured to:
   output, to a second device, a first request to establish a communication session between the first device and the second device, wherein the request includes a first value;
   receive, from the second device, a second request to establish the communication session between the first device and the second device, wherein the second request includes a second value;
   compare the first value, included in the first request outputted by the first device, with the second value included in the second request received from the second device;
   determine, based on comparing the first and second values, that the first device has priority, wherein the second device also determines, based on the first and second values, that the first device has priority;
   output, based on determining that the first device has priority, a blockchain establishment message to a set of devices that includes a third device, wherein the first device and the set of devices establish a blockchain that is accessible to the first and second devices, wherein the second device forgoes outputting a blockchain establishment message based on determining that the first device has priority;
   encrypt a communication associated with the communication session using a double ratchet encryption technique;
   record, to the blockchain associated with the communication session, one or more keys associated with the encrypting of the communication using the double ratchet encryption technique; and
   output the encrypted communication to the second device via the communication session, wherein the second device retrieves the one or more keys from the blockchain and uses the one or more keys to decrypt the encrypted communication.

2. The first device of claim 1, wherein the first value includes a first randomly generated number and wherein the second value includes a second randomly generated number.

3. The first device of claim 1, wherein the first value is based on a first unique identifier associated with the first device, and wherein the second value is associated with a second unique identifier associated with the second device.

4. The first device of claim 1, wherein the one or more hardware processors are further configured to:
   identify a set of contacts from a contact list associated with the first device, wherein the set of devices include one or more devices associated with the set of contacts from the contact list associated with the first device.

5. The first device of claim 4, wherein the contact list is a first contact list and the set of contacts is a first set of contacts, wherein the one or more hardware processors are further configured to:
   receive, from the second device, information regarding one or more devices associated with a second set of contacts from a second contact list associated with the second device,
   wherein the set of devices further include the one or more devices associated with the second set of contacts from the second contact list associated with the second device.

6. The first device of claim 1, wherein the set of devices does not include the first device.

7. The first device of claim 1,
   wherein the communication session is associated with a particular communication session identifier, and
   wherein recording the one or more keys to the blockchain includes recording information, associating the one or more keys and the particular communication session identifier, to the blockchain.

8. A system, comprising:
   a first device comprising one or more hardware processors, and
   a second device comprising one or more hardware processors, wherein the second device is configured to:
   output, to the first device, a first request to establish a communication session between the first device and the second device, wherein the request includes a first value;
   receive, from the first device, a second request to establish the communication session between the first device and the second device, wherein the second request includes a second value;
   compare the first value, included in the first request outputted by the first device, with the second value included in the second request received from the second device;

determine, based on comparing the first and second values, that the first device has priority, wherein the second device also determines, based on the first and second values, that the first device has priority;

output, based on determining that the first device has priority, a blockchain establishment message to a set of devices that includes a third device, wherein the first device and the set of devices establish a blockchain that is accessible to the first and second devices, wherein the second device forgoes outputting a blockchain establishment message based on determining that the first device has priority;

encrypt a communication associated with the communication session using a double ratchet encryption technique;

record, to the blockchain associated with the communication session, one or more keys associated with the encrypting of the communication using the double ratchet encryption technique; and output the encrypted communication to the second device via the communication session, wherein the second device retrieves the one or more keys from the blockchain and uses the one or more keys to decrypt the encrypted communication.

9. The system of claim 8, wherein the first value includes a first randomly generated number and wherein the second value includes a second randomly generated number.

10. The system of claim 8, wherein the first value is based on a first unique identifier associated with the second device, and wherein the second value is associated with a second unique identifier associated with the first device.

11. The system of claim 8, wherein the second device is further configured to:

identify a set of contacts from a contact list associated with the second device, wherein the set of devices include one or more devices associated with the set of contacts from the contact list associated with the second device.

12. The system of claim 11, wherein the contact list is a first contact list and the set of contacts is a first set of contacts, wherein the second device is further configured to:

receive, from the first device, information regarding one or more devices associated with a second set of contacts from a second contact list associated with the first device, wherein the set of devices further include the one or more devices associated with the second set of contacts from the second contact list associated with the first device.

13. The system of claim 8, wherein the communication session is associated with a particular communication session identifier, and wherein recording the one or more keys to the blockchain includes recording information, associating the one or more keys and the particular communication session identifier, to the blockchain.

14. A method performed by a first device, the method comprising:

outputting, to a second device, a first request to establish a communication session between the first device and the second device, wherein the request includes a first value;

receiving, from the second device, a second request to establish the communication session between the first device and the second device, wherein the second request includes a second value;

comparing the first value, included in the first request outputted by the first device, with the second value included in the second request received from the second device;

determining, based on comparing the first and second values, that the first device has priority, wherein the second device also determines, based on the first and second values, that the first device has priority;

outputting, based on determining that the first device has priority, a blockchain establishment message to a set of devices that includes a third device, wherein the first device and the set of devices establish a blockchain that is accessible to the first and second devices, wherein the second device forgoes outputting a blockchain establishment message based on determining that the first device has priority;

encrypting a communication associated with the communication session using a double ratchet encryption technique;

recording, to the blockchain associated with the communication session, one or more keys associated with the encrypting of the communication using the double ratchet encryption technique; and outputting the encrypted communication to the second device via the communication session, wherein the second device retrieves the one or more keys from the blockchain and uses the one or more keys to decrypt the encrypted communication.

15. The method of claim 14, wherein the first value includes a first randomly generated number and wherein the second value includes a second randomly generated number.

16. The method of claim 14, wherein the first value is based on a first unique identifier associated with the first device, and wherein the second value is associated with a second unique identifier associated with the second device.

17. The method of claim 14, further comprising:

identifying a set of contacts from a contact list associated with the first device, wherein the set of devices include one or more devices associated with the set of contacts from the contact list associated with the first device.

18. The method of claim 17, wherein the contact list is a first contact list and the set of contacts is a first set of contacts, the method further comprising:

receiving, from the second device, information regarding one or more devices associated with a second set of contacts from a second contact list associated with the second device, wherein the set of devices further include the one or more devices associated with the second set of contacts from the second contact list associated with the second device.

19. The method of claim 14, wherein the set of devices does not include the first device.

20. The method of claim 14, wherein the communication session is associated with a particular communication session identifier, and wherein recording the one or more keys to the blockchain includes recording information, associating the one or more keys and the particular communication session identifier, to the blockchain.

* * * * *